US012231952B2

United States Patent
Jin et al.

(10) Patent No.: US 12,231,952 B2
(45) Date of Patent: Feb. 18, 2025

(54) METHOD AND DEVICE FOR REPORTING UE CAPABILITY IN WIRELESS COMMUNICATION SYSTEM

(71) Applicant: Samsung Electronics Co., Ltd., Gyeonggi-do (KR)

(72) Inventors: Seungri Jin, Gyeonggi-do (KR); Soenghun Kim, Gyeonggi-do (KR); Himke Van Der Velde, Zwolle (NL)

(73) Assignee: Samsung Electronics Co., Ltd. (KR)

( * ) Notice: Subject to any disclaimer, the term of this patent is extended or adjusted under 35 U.S.C. 154(b) by 453 days.

(21) Appl. No.: 17/607,525

(22) PCT Filed: May 4, 2020

(86) PCT No.: PCT/KR2020/005860
§ 371 (c)(1),
(2) Date: Oct. 29, 2021

(87) PCT Pub. No.: WO2020/226389
PCT Pub. Date: Nov. 12, 2020

(65) Prior Publication Data
US 2022/0217583 A1    Jul. 7, 2022

(30) Foreign Application Priority Data

May 7, 2019 (KR) .................. 10-2019-0053243

(51) Int. Cl.
*H04W 28/06* (2009.01)
*H04W 8/24* (2009.01)
*H04W 80/02* (2009.01)

(52) U.S. Cl.
CPC ........... *H04W 28/065* (2013.01); *H04W 8/24* (2013.01); *H04W 80/02* (2013.01)

(58) Field of Classification Search
CPC ..... H04W 28/065; H04W 8/24; H04W 80/02; H04W 28/06; H04L 47/365
See application file for complete search history.

(56) References Cited

U.S. PATENT DOCUMENTS

2016/0262053 A1   9/2016 Palm et al.
2019/0200212 A1*  6/2019 Quan .................... H04W 76/10
(Continued)

FOREIGN PATENT DOCUMENTS

KR    1020200118724    10/2020

OTHER PUBLICATIONS

3GPP, 3rd Generation Partnership Project; Technical Specification Group Radio Access Network; NR and Evolved Universal Terrestrial Radio Access (E-UTRA) Study on Optimizations of UE Radio Capability Signalling; (Release 16), 3GPP TR 37.873 V16.0.0, Mar. 2019, 16 pages.

(Continued)

*Primary Examiner* — Derrick W Ferris
*Assistant Examiner* — M Mostazir Rahman
(74) *Attorney, Agent, or Firm* — The Farrell Law Firm, P. C.

(57) ABSTRACT

Provided is a method of reporting user equipment (UE) capability information, including: receiving a UE capability information request message from a base station; generating a UE capability information message, based on the received UE capability information request message; determining whether the generated UE capability information message exceeds a configured largest size of a packet data convergence protocol (PDCP) protocol data unit (PDU); segmenting the generated UE capability information message into a plurality of segments, based on a result of the determining; and transmitting at least one of the plurality of segments to the base station.

11 Claims, 19 Drawing Sheets

(56) References Cited

U.S. PATENT DOCUMENTS

2020/0305220 A1* 9/2020 Iwai .................. H04W 72/1263
2021/0243590 A1 8/2021 Jin et al.
2021/0314805 A1* 10/2021 Sanda .................. H04L 43/062

OTHER PUBLICATIONS

MediaTek Inc., "RRC Segmentation for Transfer of UE Capability", R2-1906030, 3GPP TSG-RAN WG2 Meeting #106, May 13-17, 2019, 3 pages.
Ericsson, Introduction of RRC Segmentation—Downlink (38.331), R2-1907327, 3GPP TSG-RAN2 Meeting #106, May 13-17, 2019, 10 pages.
Apple, "Segmentation of UE Capability", R2-1903628, 3GPP TSG-RAN WG2 Meeting #105bis, Apr. 8-12, 2019, 4 pages.
International Search Report dated Jul. 31, 2020 issued in counterpart application No. PCT/KR2020/005860, 16 pages.
Korean Office Action dated Oct. 5, 2024 issued in counterpart application No. 10-2019-0053243, 6 pages.

\* cited by examiner

FIG. 1G

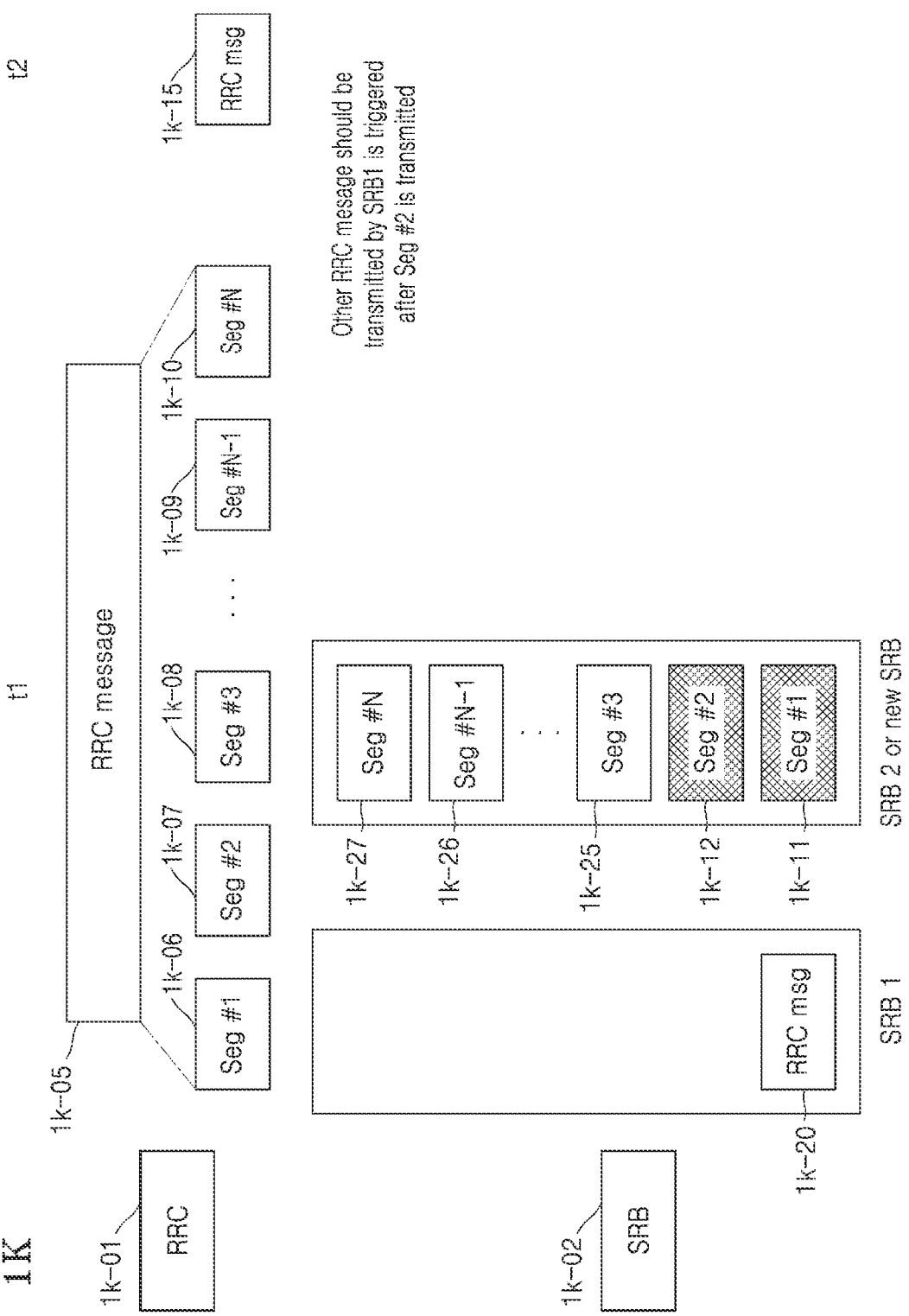

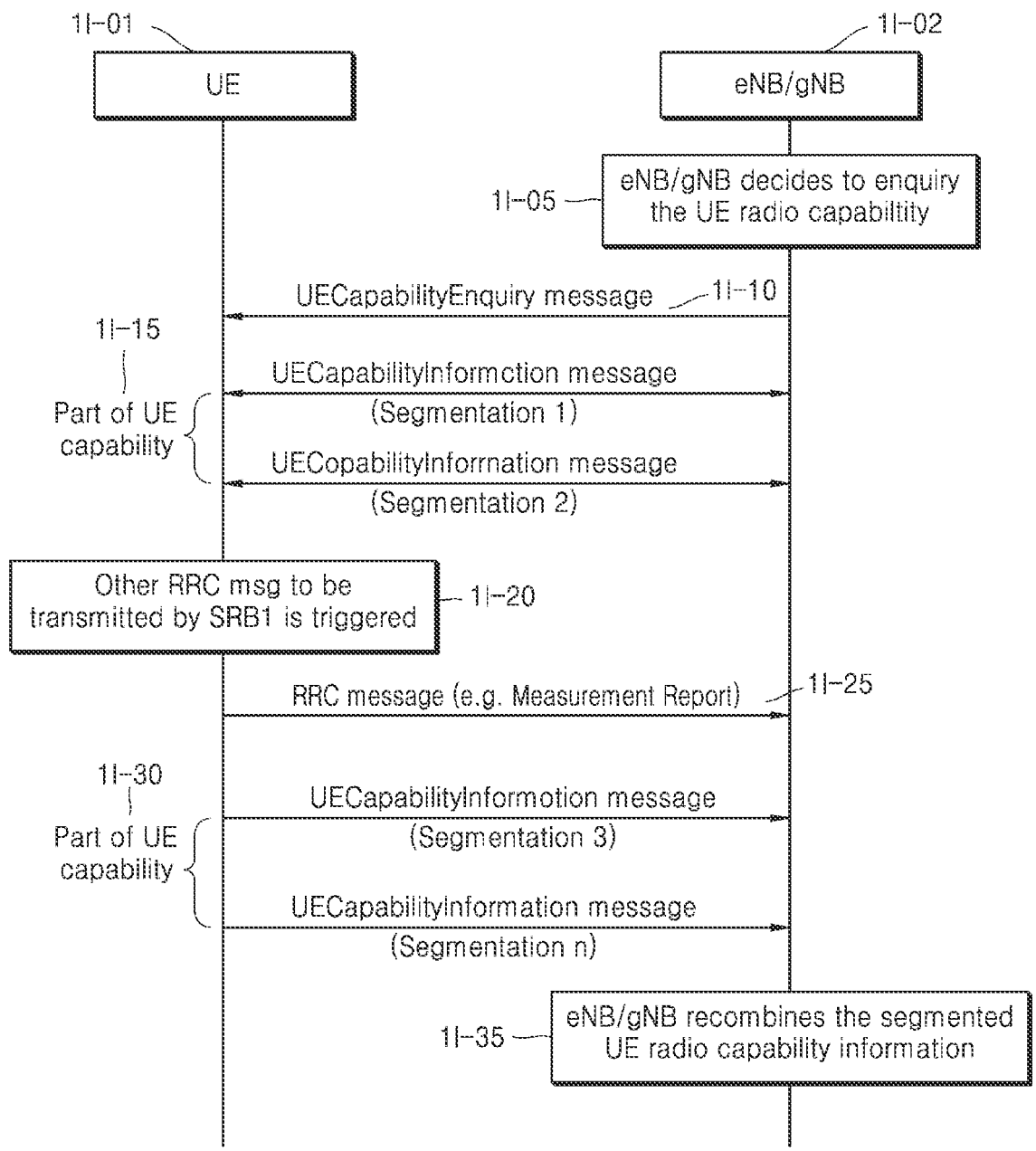

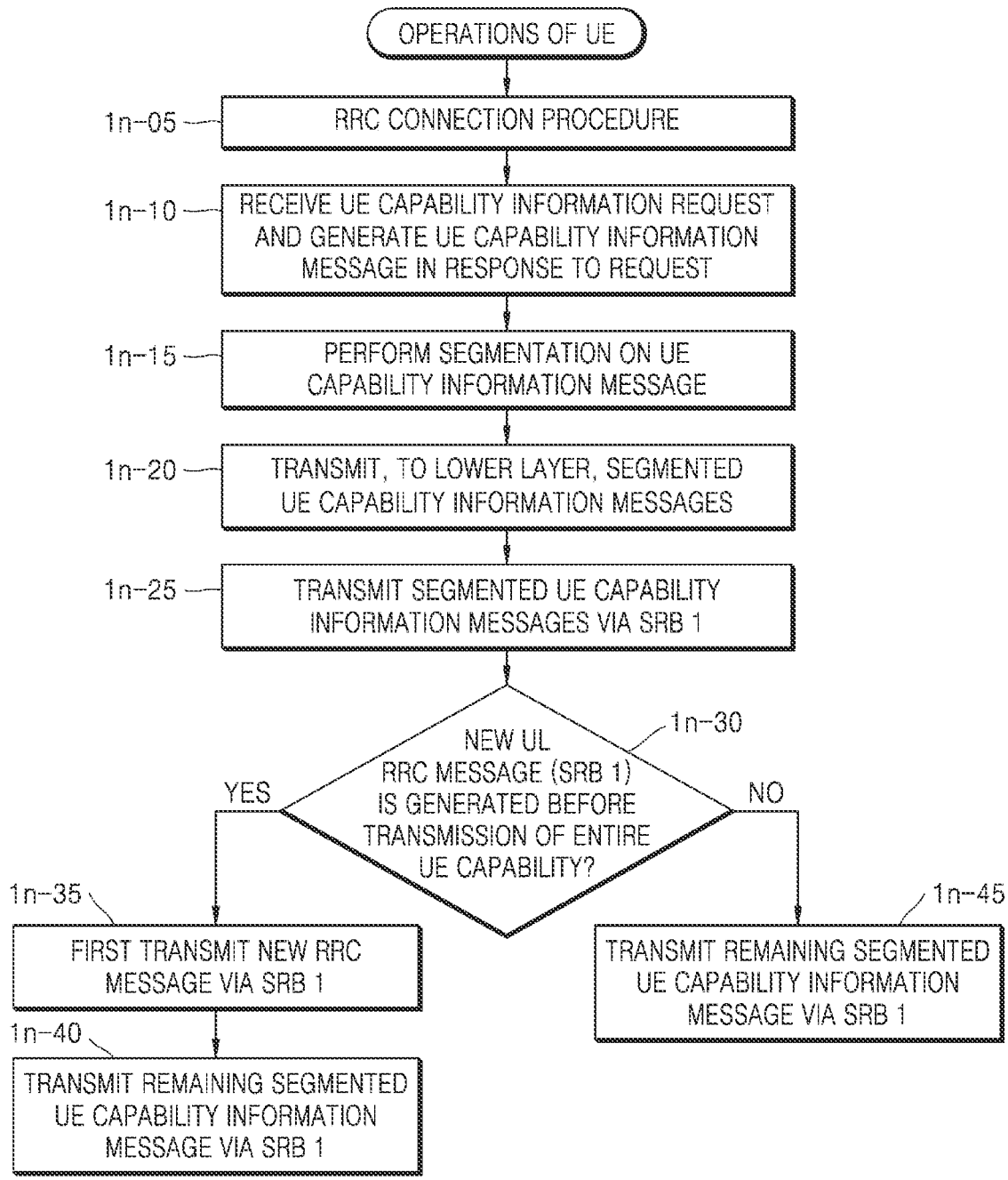

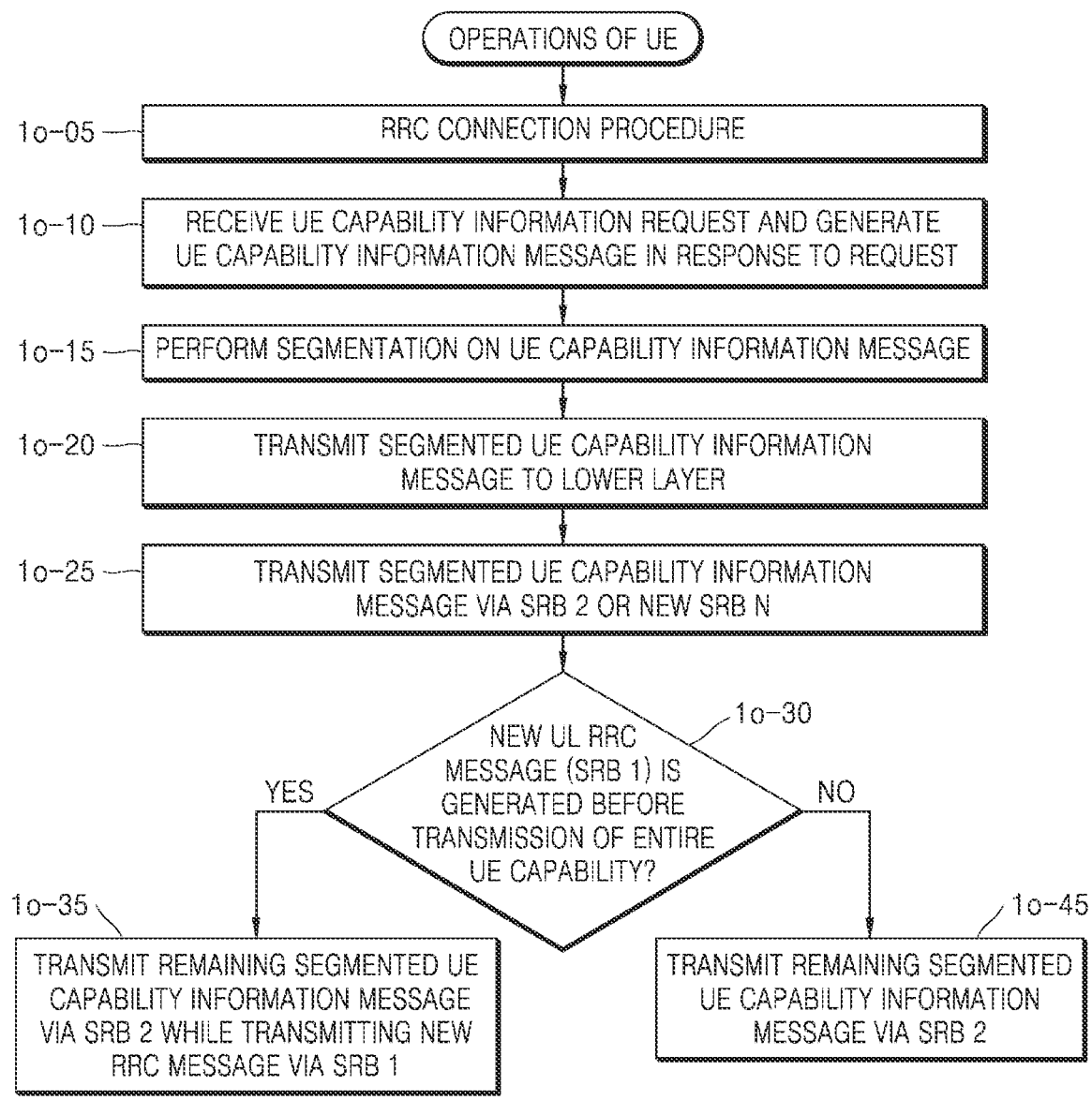

METHOD AND DEVICE FOR REPORTING UE CAPABILITY IN WIRELESS COMMUNICATION SYSTEM

PRIORITY

This application is a National Phase Entry of PCT International Application No. PCT/KR2020/005860 which was filed on May 4, 2020, and claims priority to Korean Patent Application No. 10-2019-0053243, which was filed on May 7, 2019, the entire content of each of which is incorporated herein by reference.

TECHNICAL FIELD

The present disclosure relates to a wireless communication system, and more particularly, to a method of reporting a user equipment (UE) capability.

BACKGROUND ART

To meet the exploding increase in demand for wireless data traffic due to the commercialization of 4th generation (4G) systems and the increase of multimedia services, improved 5G communication systems or pre-5G communication systems are being developed. This is one reason why 5G communication systems or pre-5G communication systems are called beyond 4G network communication systems or post long-term evolution (LTE) systems.

In order to increase a data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas.

Also, in order to improve system network performance for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (COMP), and interference cancellation. Also, for 5G communication systems, other technologies have been developed, e.g., hybrid frequency-shift keying (FSK) and quadrature amplitude modulation (QAM) (FOAM) and sliding window superposition coding (SWSC), which are advanced coding modulation (ACM) schemes, and filter bank multi carrier (FBMC), non-orthogonal multiple access (NOMA), and sparse code multiple access (SOMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

As described above, various services may be provided with the development of wireless communication systems, and thus there is a need for methods of smoothly supporting communication by using methods of reporting capabilities of terminals.

DESCRIPTION OF EMBODIMENTS

Technical Problem

Provided are a method and apparatus for effectively providing a service in a mobile communication system.

Solution to Problem

Provided are a method and apparatus for transmitting or receiving user equipment (UE) capability information.

Advantageous Effects of Disclosure

Embodiments provide an apparatus and method for effectively providing a service in a mobile communication system.

BRIEF DESCRIPTION OF DRAWINGS

FIG. 1G is a diagram of a method of applying segmentation to a UE capability information message in an NR system, according to an embodiment of the present disclosure.

FIG. 1K is a diagram of a method of avoiding an effect on transmission of a second RRC message (message transmitted via an SRB 1) newly generated by transmitting a segmented RRC message via an SRB different from an SRB to which the segmented RRC message was transmitted, according to an embodiment of the present disclosure.

FIG. 1L is a diagram of an overall flowchart related to operations when another RRC message to be transmitted via an SRB 1 is generated while transmitting an uplink segmentation message, according to an embodiment of the present disclosure.

FIG. 1N is a diagram of operations of a UE for processing a second RRC message when the second RRC message is newly generated while a segmented RRC message is generated and transmitted via an SRB, according to an embodiment of the present disclosure.

FIG. 1O is a diagram of operations of a UE for avoiding an effect on transmission of a second RRC message (message transmitted via an SRB 1) newly generated by transmitting a segmented RRC message via an SRB different from an SRB to which the segmented RRC message was transmitted, according to an embodiment of the present disclosure.

BEST MODE

Figure 1A:
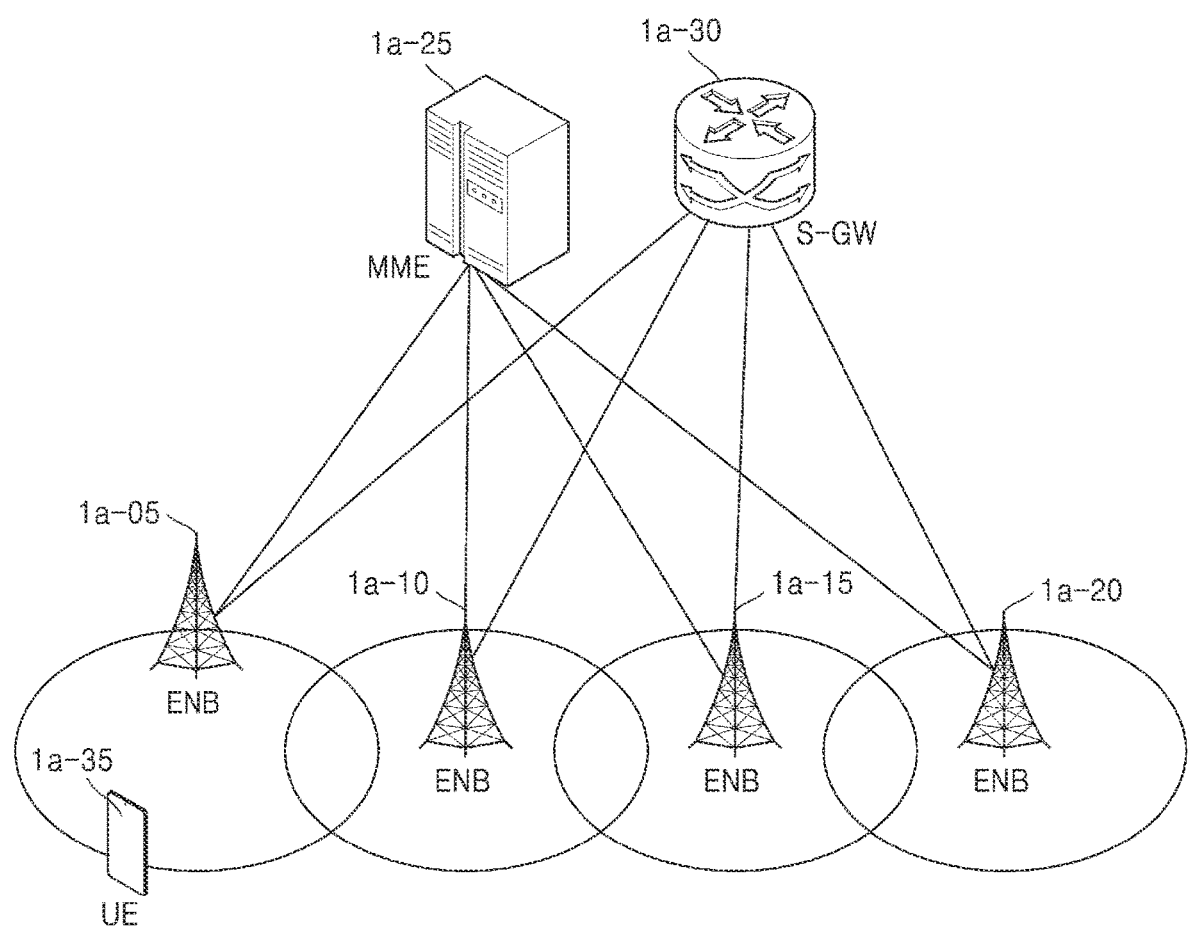
FIG. 1A is a diagram of a structure of a long-term evolution (LTE) system, according to an embodiment of the present disclosure.

According to an embodiment of the present disclosure, a method of reporting user equipment (UE) capability information, includes: receiving a UE capability information request message from a base station; generating a UE capability information message, based on the received UE capability information request message; determining whether the generated UE capability information message exceeds a configured largest size of a configured packet data convergence protocol (PDCP) protocol data unit (PDU); segmenting the generated UE capability information message into a plurality of segments, based on a result of the determining; and transmitting at least one of the plurality of segments to the base station.

The segmenting of the generated UE capability information message may include segmenting UE-CapabilityRAT-ContainerList in the generated UE capability information message into the plurality of segments or segmenting a result of encoding the entire UE capability information message into the plurality of segments, wherein sizes of the plurality of segments may be remaining sizes obtained by excluding a message header size from the configured largest size of the PDCP PDU.

The transmitting of the at least one of the plurality of segments to the base station may include: transmitting, to the base station via a signaling radio bearer (SRB) 1, a first segment from among the plurality of segments generated by segmenting the UE capability information message; generating a radio resource control (RRC) message to be transmitted via the SRB 1; and transmitting the generated RRC message first before a second segment from among the plurality of segments generated by segmenting the UE capability information message is transmitted, based on a priority of the generated RRC message.

The transmitting of the at least one of the plurality of segments to the base station may include transmitting the plurality of segments via an SRB 2 or another SRB and transmitting an RRC message via an SRB 1.

The method may further include: receiving, from the base station, a plurality of segments generated by segmenting an RRC reconfiguration message; and reassembling the plurality of segments.

The receiving, from the base station, of the plurality of segments generated by segmenting the RRC reconfiguration message may include: receiving, from the base station via an SRB 1, a first segment from among the plurality of segments generated by segmenting the RRC reconfiguration message; and receiving an RRC message via the SRB 1, after the first segment is received and before a second segment is received.

The receiving, from the base station, of the plurality of segments generated by segmenting the RRC reconfiguration message may include receiving the plurality of segments via an SRB 2 or another SRB and receiving an RRC message via an SRB 1.

According to another embodiment of the present disclosure, a method of obtaining user equipment (UE) capability information, includes: transmitting a UE capability information request message to a UE; receiving, from the UE, a plurality of segments generated by segmenting a UE capability information message; storing the plurality of segments in a buffer; and reassembling the plurality of segments.

The receiving, from the UE, of the plurality of segments generated by segmenting the UE capability information message may include: receiving, from the UE via a signaling radio bearer (SRB) 1, a first segment from among the plurality of segments generated by segmenting the UE capability information message; and receiving a radio resource control (RRC) message via the SRB 1, after the first segment is received and before a second segment is received.

The receiving, from the UE, of the plurality of segments generated by segmenting the UE capability information message may include receiving the plurality of segments via an SRB 2 or another SRB and receiving an RRC message via an SRB 1.

The method may further include: generating an RRC reconfiguration message; determining whether the generated RRC reconfiguration message exceeds a configured largest size of a packet data convergence protocol (PDCP) protocol data unit (PDU); segmenting the generated RRC reconfiguration message into a plurality of segments, based on a result of the determining; and transmitting at least one of the plurality of segments to the UE.

The transmitting of the at least one of the plurality of segments to the UE may include: transmitting, to the UE via an SRB 1, a first segment from among the plurality of segments generated by segmenting the RRC reconfiguration message; generating an RRC message to be transmitted via the SRB 1; and transmitting the generated RRC message first before a second segment from among the plurality of segments generated by segmenting the RRC reconfiguration message is transmitted, based on a priority of the generated RRC message.

The transmitting of the at least one of the plurality of segments to the UE may include transmitting the plurality of segments via an SRB 2 or another SRB and transmitting an RRC message via an SRB 1.

According to another embodiment of the present disclosure, a user equipment (UE) for reporting UE capability information, includes: a transceiver; and a processor coupled to the transceiver and configured to receive a UE capability information request message from a base station, generate a UE capability information message based on the received UE capability information request message, determine whether the generated UE capability information message exceeds a configured largest size of a packet data convergence protocol (PDCP) protocol data unit (PDU), segment the generated UE capability information message into a plurality of segments based on a result of the determination, and transmit at least one of the plurality of segments to the base station.

According to another embodiment of the present disclosure, a base station for obtaining user equipment (UE) capability information, includes: a transceiver; and a processor coupled to the transceiver and configured to transmit a UE capability information request message to a UE, receive, from the UE, a plurality of segments generated by segmenting a UE capability information message, store the plurality of segments in a buffer, and reassemble the plurality of segments.

Mode of Disclosure

Hereinafter, operation principles of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification. Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

Hereinafter, a base station is an entity that assigns resources of a terminal, and may be at least one of a gNode B (gNB), an eNode B (eNB); a Node B (NB), a base station (BS), a wireless access unit, a BS controller, or a node on a network. Examples of a terminal may include user equipment (UE), a mobile station (MS), a cellular phone, a smartphone, a computer, and a multimedia system capable of performing a communication function. Also, the term 'terminal' may indicate not only mobile phones, narrow band-Internet of things (NB-IoT) devices, and sensors, but also other wireless communication devices. Obviously, the base station and the terminal are not limited to the above examples.

Hereinafter, for convenience of description, the present disclosure uses terms and names defined by the 3rd Generation Partnership Project Long Term Evolution (3GPP LTE) standard and/or the 3GPP new radio (NR) standard. However, the present disclosure is not limited by such terms and names, and may be equally applied to systems conforming to other standards.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra-reliability low latency communication (hereinafter, URLLC), etc.

According to an embodiment; the eMBB aims to provide a higher data rate than a data rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded in the 5G communication system. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT, The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra-low latency) and very high reliability (ultra-high reliability). For example, a service supporting the URLLC should satisfy air interface latency smaller than 0.5 milliseconds and at the same time, may have a packet error rate of $10^{-5}$ or less. Accordingly, for URLLC-supportive services, the 5G system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the present disclosure is applied are not limited thereto.

Also, although embodiments of the present disclosure are described by using the LTE, LTE-A, LTE Pro, or 5G (or NR) system, the embodiments of the present disclosure may be applied to other communication systems having a similar technical background or channel type. Also, it will be understood by one of ordinary skill in the art that embodiments of the present disclosure may be applied to other communication systems through some modifications without departing from the scope of the present disclosure.

In a series of general procedures of a terminal (UE) receiving, from a base station, a request for a user equipment (UE) capability and reporting the UE capability, the UE capability is unable to be transmitted in totality, when UE capability information exceeds a largest size of a packet data convergence protocol (PDCP) protocol data unit (PDU). However, in an actual system, UE information frequently exceeds the largest size of the PDCP PDU, and thus there is a need for a method of reporting the UE capability information exceeding the largest size of the PDCP PDU. Accordingly, the present disclosure proposes a method of, when an NR terminal receives a request for a UE capability from a base station and generates a corresponding UE capability information message, reporting the entire UE capability generated by the terminal even when the UE capability information message exceeds a largest size of a PDCP PDU. The present disclosure below relates to a wireless communication system, and more particularly, a method of reporting a UE capability, more specifically, a method of transmitting an entire UE capability information message by segmenting the UE capability information message into a plurality of pieces.

Hereinafter, embodiments of the present disclosure will be described with reference to accompanying drawings.

FIG. 1A is a diagram of a structure of a long-term evolution (LTE) system, according to an embodiment of the present disclosure.

Referring to FIG. 1A, a radio access network (RAN) of the LTE system may include evolved node Bs (eNBs) 1*a*-05, 1*a*-10, 1*a*-15, and 1*a*-20 (node Bs (NBs) or base stations), a mobility management entity (MME) 1*a*-25, and a serving-gateway (S-GW) 1*a*-30. A user equipment (UE) or a terminal 1*a*-35 may access an external network via the eNB 1*a*-05, 1*a*-10, 1*a*-15, or 1*a*-20 and the S-GW 1*a*-30.

In FIG. 1A, the eNBs 1*a*-05 through 1*a*-20 correspond to existing NBs of a universal mobile telecommunication system (UMTS). The eNB 1*a*-05, 1*a*-10, 1*a*-15, or 1*a*-20 is connected to the UE 1*a*-35 through a radio channel and performs complex functions compared to the existing NB. Because all user traffic data including real-time services such as voice over Internet protocol (VoIP) is serviced through shared channels in the LTE system, an entity for collating buffer status information of UEs, available transmission power status information, channel status information, etc. and performing scheduling is required and each of the eNBs 1*a*-05, 1*a*-10, 1*a*-15, and 1*a*-20 serves as such an entity. A single eNB generally controls a plurality of cells. For example, the LTE system may use radio access technology such as orthogonal frequency division multiplexing (OFDM) at a bandwidth of 20 MHz to achieve a data rate of 100 Mbps. Obviously, the radio access technology usable by the LTE system is not limited to the above example. Also, the eNBs 1*a*-05 through 1*a*-20 may use adaptive modulation & coding (AMC) to determine a modulation scheme and a channel coding rate in accordance with a channel status of the terminal. The S-GW 1*a*-30 is an entity for providing a data bearer and may generate or remove a data bearer under control by the MME 1*a*-25. The MME 1*a*-25 is an entity for performing a mobility management function and various control functions for the terminal and may be connected to a plurality of base stations.

Figure 1B:
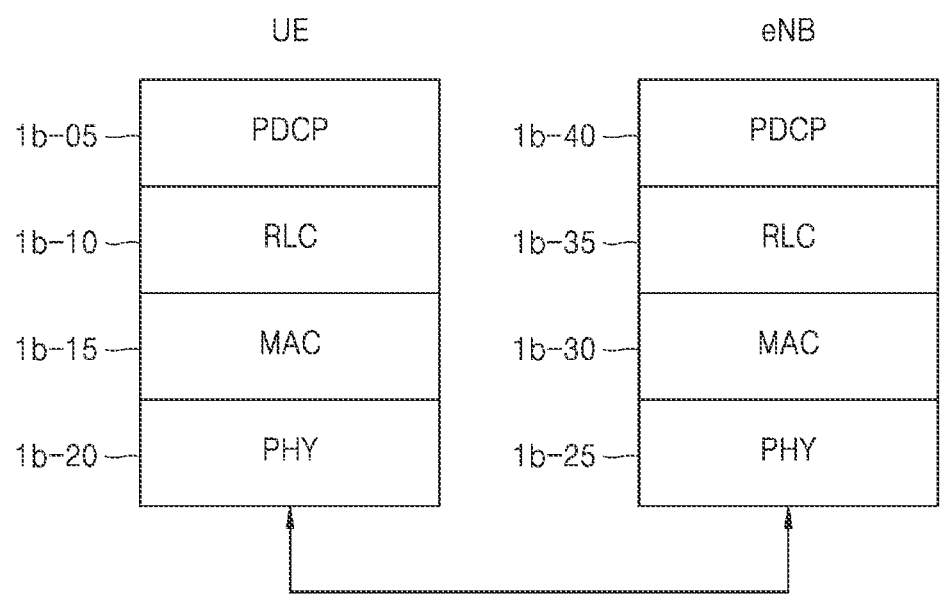
FIG. 1B is a diagram of a radio protocol architecture in an LTE system, according to an embodiment of the present disclosure.

FIG. 1B is a diagram of a radio protocol architecture in an LTE system, according to an embodiment of the present disclosure.

Referring to FIG. 1B, a radio protocol of the LTE system may include PDCP layers 1*b*-05 and 1*b*-40, radio link control (RLC) layers 1*b*-10 and 1*b*-35, and media access control (MAC) layers 1*b*-15 and 1*b*-30 respectively for a UE and an eNB. The PDCP layer 1*a*-05 and 1*a*-40 may perform operations such as internet protocol (IP) header compression/reconstruction. Main functions of the PDCP layer 1*b*-05 or 1*b*-40 are summarized below. Obviously, the functions of the PDCP layer 1*b*-05 or 1*b*-40 are not limited thereto, Header compression and decompression: Robust header compression (ROHC) only Transfer of user data In-sequence delivery of upper layer PDUs at PDCP re-establishment procedure for RLC acknowledged mode (AM)

For split bearers in dual connectivity (DC) (only support for RLC AM): PDCP PDU routing for transmission and PDCP PDU reordering for reception)

Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 may perform, for example, an automatic repeat request (ARQ) operation by reconfiguring PDCP PDUs to appropriate sizes. Main functions of the RLC layer 1b-10 or 1b-35 are summarized below. Obviously, the functions of the RLC layer 1b-10 or 1b-35 are not limited thereto.

Transfer of upper layer PDUs

Error Correction through ARQ (only for AM data transfer)

Concatenation, segmentation, and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 are summarized below. Obviously, the functions of the MAC layer 1b-15 or 1b-30 are not limited thereto.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through HARQ Priority handling between logical channels of one UE Priority handling between UEs by means of dynamic scheduling Multimedia broadcast and multicast service (MBMS) identification Transport format selection Padding The physical (PHY) layer 1d-20 or 1d-25 may channel-code and modulate higher layer data into OFDM symbols and transmit the OFDM symbols through a radio channel. Also, the PHY layer 1d-20 or 1d-25 may demodulate OFDM symbols received through a radio channel and channel-decode and deliver the OFDM symbols to a higher layer. The PHY layer 1d-20 or 1d-25 also uses HARQ for additional error correction, and a reception end transmits information about reception of a packet transmitted from a transmission end in one bit. This is referred to as HARQ ACK/NACK information. Downlink HARQ ACK/NACK information regarding uplink transmission may be transmitted via a physical HARQ indicator channel (PHICH), and uplink HARQ ACK/NACK information regarding downlink transmission may be transmitted via a physical uplink control channel (PUCCH) or a physical uplink shared channel (PUSCH). The PHY layer 1b-20 or 1b-25 may be configured to use one or a plurality of frequencies/carriers, and a technology for simultaneously configuring and using the plurality of frequencies is referred to as a carrier aggregation (CA) technology. According to the CA technology, a transmission amount may be dramatically increased by a number of subcarriers, by using a main carrier and one or a plurality of additional subcarriers, for communication between a terminal (or UE) and a base station (E-UTRAN NB or eNB), In LTE), a cell in the eNB using a main carrier is referred to as a primary cell (Pcell), and a cell in the eNB using a subcarrier is referred to as a secondary cell (Scell).

Although not illustrated, an RRC layer is present in each of higher layers of PDCP layers 1b-05 and 1b-40 of the UE and the eNB, and may exchange access and measurement-related configuration control messages for radio resource control.

Figure 1C:
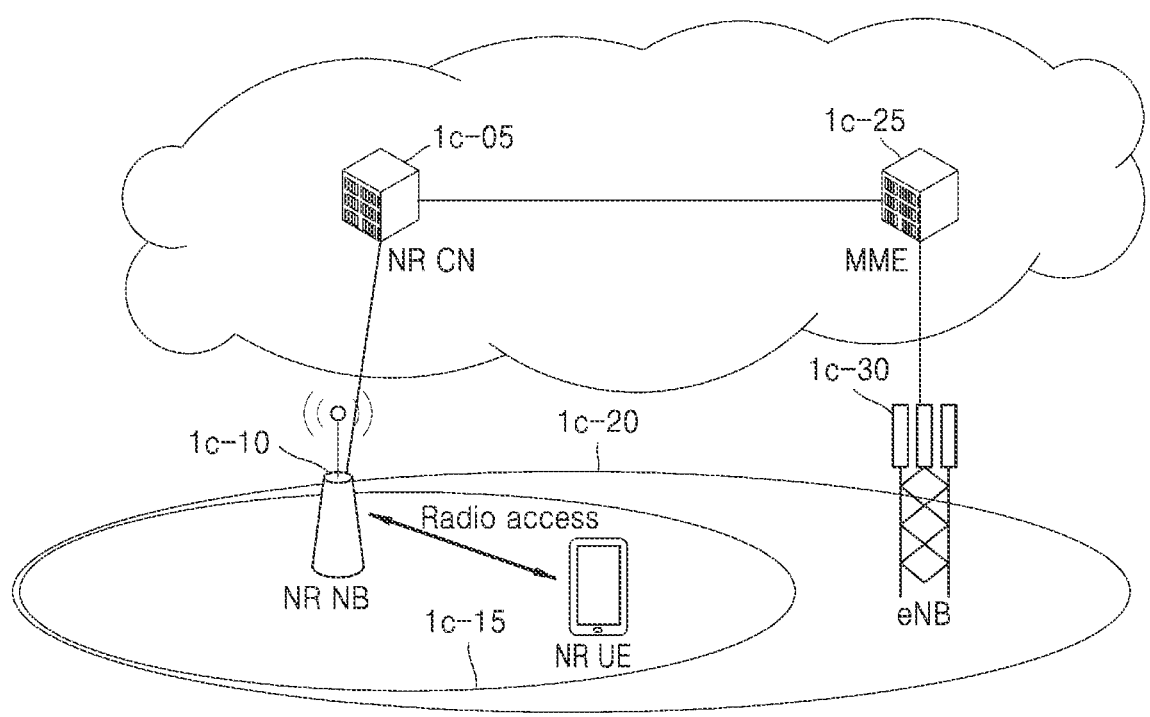
FIG. 1C is a diagram of a structure of a next-generation mobile communication system, according to an embodiment of the present disclosure.

FIG. 1C is a diagram of a structure of a next-generation mobile communication system, according to an embodiment of the present disclosure.

Referring to FIG. 1C, as illustrated, a radio access network of the next-generation mobile communication system includes a new radio node B (NR NB, NR gNB, or gNB or NR base station) 1c-10 and a new radio core network (NR CN) or next generation core network (NG CN) 1c-05. A new radio user equipment (NR UE) or terminal 1c-15 may access an external network via the NR NB 1c-10 and the NR CN 1c-05.

In FIG. 1C, the NR NB 1c-10 corresponds to an eNB of an existing LTE system. The NR NB 1c-10 is connected to the NR UE 1c-15 through radio channels and may provide superior services compared to an existing NB. Because all user traffic data is serviced through shared channels in the next-generation mobile communication system, an entity for collating buffer status information of UEs, available transmission power status information, channel status information, etc. and performing scheduling is required and such operations may be performed by the NR NB 1c-10. A single NR NB 1c-10 generally controls a plurality of cells. According to an embodiment of the present disclosure, the next-generation mobile communication system may have a bandwidth equal to or greater than an existing maximum bandwidth of LTE to achieve an ultrahigh data rate, and beamforming technology may be additionally used by using OFDM as radio access technology. Also, the NR NB 1c-10 may use AMC to determine a modulation scheme and a channel coding rate in accordance with a channel status of the terminal. The NR CN 1c-05 may perform functions such as mobility support, bearer setup, and quality of service (QoS) setup. The NR CN 1c-05 is an entity for performing a mobility management function and various control functions for the terminal and may be connected to a plurality of base stations. The next-generation mobile communication system may cooperate with the existing LTE system, and the NR CN 1c-05 is connected to an MME 1c-25 through a network interface. The MME 1c-25 is connected to an eNB 1c-30 that is an existing base station.

Figure 1D:
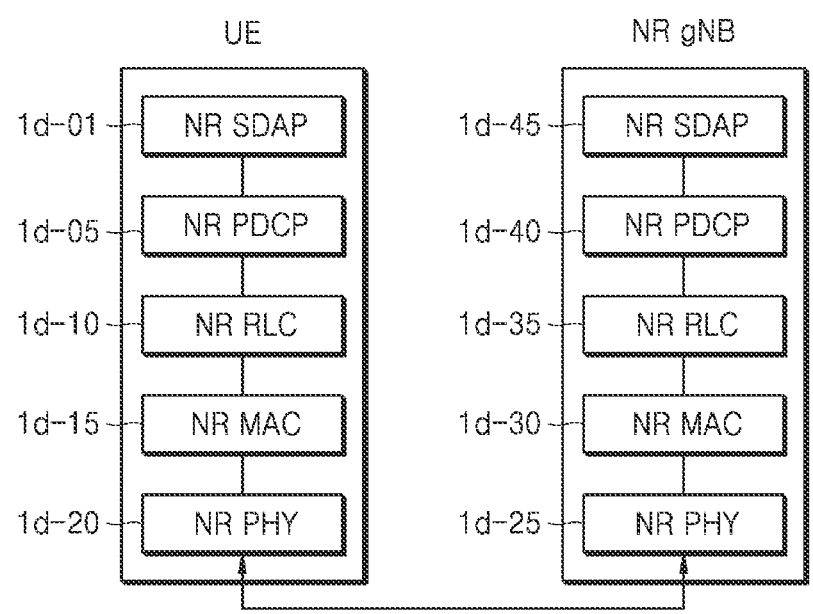
FIG. 1D is a diagram of a radio protocol architecture of a next-generation mobile communication system, according to an embodiment of the present disclosure.

FIG. 1D is a diagram of a radio protocol architecture of a next-generation mobile communication system, according to an embodiment of the present disclosure.

Referring to FIG. 1D, a radio protocol of the next-generation mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

According to an embodiment of the present disclosure, main functions of the NR SDAP layers 1d-01 and 1d-45 may include some of the following functions. Obviously, the functions of the NR SDAP layer 1d-01 or 1b-45 are not limited thereto.

Transfer of user plane data
Mapping between QoS flow and a data radio bearer (DRB) for both downlink (DL) and uplink (UL)
Marking QoS flow ID in both DL and UL packets
Reflective QoS flow to ORB mapping for the UL SOAP PDUs With respect to the NR SDAP layer 1d-01 or 1d-45, the UE may receive, via an RRC message, configurations on whether to use a header of the NR SOAP layer 1d-01 or 1d-45 or use a function of the NR SOAP layer 1d-01 or 1d-45 for each NR PDCP layer 1d-05 or 1d-40, each bearer, or each logical channel. When an SDAP header is configured, an NAS reflective QoS configuration 1-bit indicator and AS reflective QoS configuration 1-bit indicator of the SOAP header may indicate the UE to update or reconfigure mapping information between a QoS flow and a data bearer for UL and DL. The SOAP header may include QoS flow ID indicating QoS, Also, according to an embodiment of the present disclosure, QoS information may be used as data processing priority information, scheduling information, etc. for supporting a smooth service.

According to an embodiment of the present disclosure, main functions of the NR PDCP layer 1d-05 or 1d-40 may include some of the following functions. Obviously, the functions of the NR PDCP layer 1d-05 or 1d-40 are not limited thereto.

Header compression and decompression: ROHC only
   Transfer of user data
   In-sequence delivery of upper layer PDUs
   Out-of-sequence delivery of upper layer PDUs
   PDCP PDU reordering for reception
   Duplicate detection of lower layer SDUs
   Retransmission of PDCP SDUs
   Ciphering and deciphering
   Timer-based SDU discard in uplink According to an embodiment of the present disclosure, a reordering function of the NR PDCP layer 1d-05 or 1d-40 may include a function of reordering PDCP PDUs received from a lower layer, based on a PDCP sequence number (SN). The reordering function of the NR PDCP layer 1d-05 or 1d-40 may include at least one of a function of delivering data to a higher layer in a reordered order, a function of immediately delivering the data without considering an order, a function of recording missing PDCP PDUs by reordering the PDCP PDUs, a function of reporting status information of the missing PDCP PDUs to a transmitter, and a function of requesting to retransmit the missing PDCP PDUs.

According to an embodiment of the present disclosure, the main functions of the NR RLC layer 1d-10 or 1d-35 may include at least some of the following functions. Obviously, the functions of the NR RLC layer 1d-10 or 1d-35 are not limited thereto.

Transfer of upper layer PDUs
   In-sequence delivery of upper layer PDUs
   Out-of-sequence delivery of upper layer PDUs
   Error correction through ARQ
   Concatenation, segmentation and reassembly of RLC SDUs
   Re-segmentation of RLC data PDUs
   Reordering of RLC data PDUs
   Duplicate detection
   Protocol error detection
   RLC SDU discard
   RLC re-establishment According to an embodiment of the present disclosure, the in-sequence delivery function of the NR RLC layer 1d-10 or 1d-35 may denote a function of delivering RLC SDUs received from a lower layer, to a higher layer in order. The in-sequence delivery function of the NR RLC layer 1d-10 or 1d-35 may include at least one of a function of reassembling RLC SDUs segmented from an RLC SDU and delivering the RLC SDUs when the segmented RLC SDUs are received, a function of reordering received RLC PDUs on an RLC SN or PDCP SN basis, a function of recording missing RLC PDUs by reordering the RLC PDUs, a function of reporting status information of the missing RLC PDUs to a transmitter, a function of requesting to retransmit the missing RLC PDUs, a function of delivering only RLC SDUs previous to a missing RLC SDU, to a higher layer in order, when the missing RLC SDU exists, a function of delivering all RLC SDUs received before a timer is started, to a higher layer in order, even if a missing RLC SDU exists, when a certain timer is expired, and a function of delivering all RLC SDUs received up to a current time, to the higher layer in order, even if a missing RLC SDU exists, when a certain timer is expired.

Also, according to an embodiment of the present disclosure, the NR RLC layer 1d-10 or 1d-35 may process the RLC PDUs in a received order (arriving order regardless of an order of serial numbers or SNs) and deliver the RLC PDUs to a PDCP layer in an out-of-sequence delivery manner, or in case of segments, may receive segments stored in a buffer or to be received later to reconfigure one complete RLC PDU, process the RLC PDU, and transmit the RLC PDU to the PDCP layer.

According to an embodiment of the present disclosure, the NR RLC layer 1d-10 or 1d-30 may not have a concatenation function, and the concatenation function may be performed by the NR MAC layer 1d-15 or 1d-30 or be replaced with a multiplexing function of the NR MAC layer 1d-15 or 1d-30.

According to an embodiment of the present disclosure, the out-of-sequence delivery of the NR RLC layer 1d-10 or 1d-30 denotes a function of delivering RLC SDUs received from a lower layer immediately to a higher layer regardless of order, and may include at least one of a function of reassembling and delivering segmented and received RLC SDUs when one RLC SDU is segmented into several RLC SDUs, and a function of recording missing RLC PDUs by storing RLC SN or PDCP SN and reordering received RLC PDUs.

According to an embodiment of the present disclosure, the NR MAC layer 1d-15 or 1d-30 may be connected to multiple NR RLC layers configured for a single UE, and main functions of the NR MAC layer 1d-15 or 1d-30 may include some of the following functions. Obviously, the functions of the NR MAC layer 1d-15 or 1d-30 are not limited thereto.

Mapping between logical channels and transport channels
   Multiplexing/demultiplexing of MAC SDUs
   Scheduling information reporting
   Error correction through HARQ
   Priority handling between logical channels of one UE
   Priority handling between UEs by means of dynamic scheduling
   MBMS identification
   Transport format selection
   Padding According to an embodiment of the present disclosure, NR PHY layer 1d-20 or 1d-25 may channel-code and modulate higher layer data into OFDM symbols and transmit the OFDM symbols through a radio channel. Also, the NR PHY layer 1d-20 or 1d-25 may demodulate OFDM symbols received through a radio channel and channel-decode and deliver the OFDM symbols to a higher layer. Obviously, the functions of the NR PHY layer 1d-20 or 1d-25 are not limited thereto.

Figure 1E:
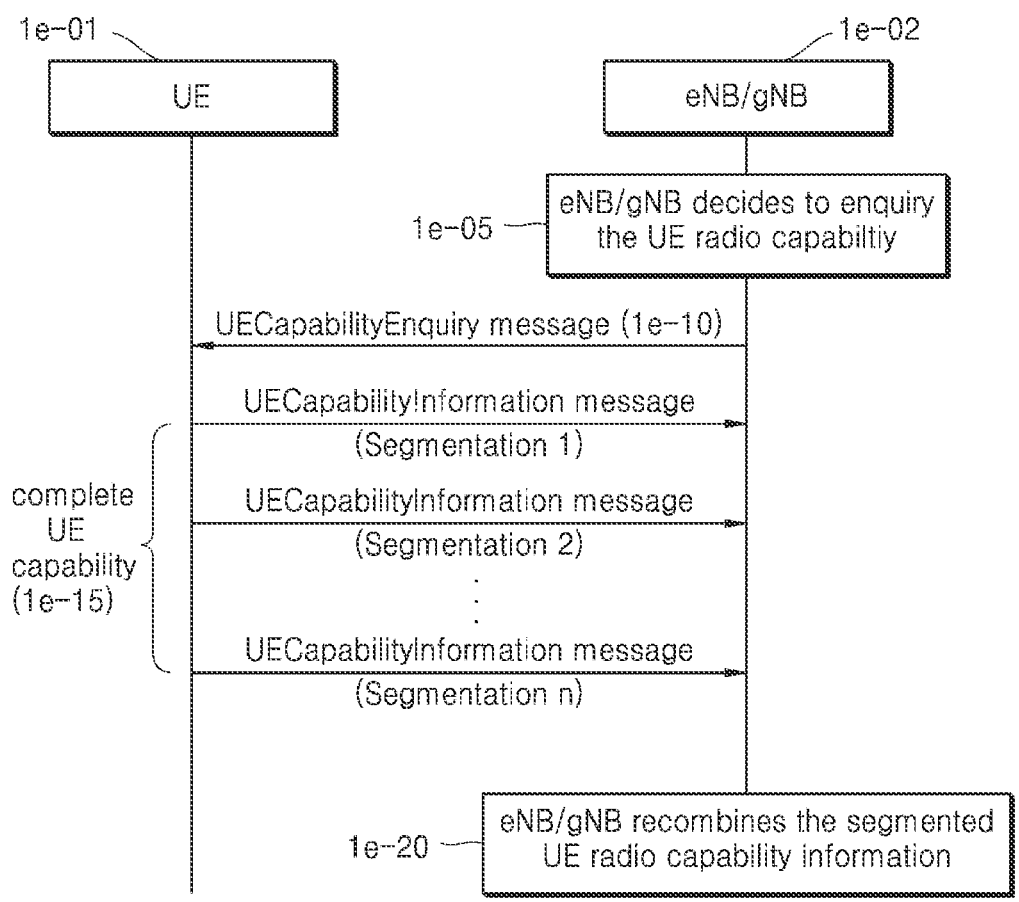
FIG. 1E is a diagram of a method of applying segmentation to a user equipment (UE) capability message when a UE capability is reported via an uplink in a new radio (NR) system, according to an embodiment of the present disclosure.

FIG. 1E is a diagram of a method of applying segmentation to a UE capability information message when a UE capability is reported via an uplink in an NR system, according to an embodiment of the present disclosure.

According to an embodiment of the present disclosure, a terminal (UE) 1e-01 reports, to a serving base station (eNB or gNB) 1e-02, a capability supported by the UE 1e-01 while being connected to the base station. In operation 1e-05, the base station (eNB or gNB) 1e-02 determines whether it is required to request the UE 1e-01, in a connected state, for capability information. The determining in operation 1e-05 may be performed by an indication (failure to retrieve UE capability) from a core network or by determination of the base station 1e-02. In operation 1e-10, the UE 1e-01 receives, from the base station 1e-02, a request (UECapabilityEnquiry message) to report UE capability information, and the UECapabilityEnquiry message may include filtering information (RAT type, frequency information, or the like) of the UE capability information. In operation 1e-15, upon receiving the UECapabilityEnquiry message, the UE 1e-01 generates a UE capability information message in response to the UE capability request of the base station 1e-02, and when the UE capability information message exceeds 9,000 bytes that is a largest size of PDCP PDU, applies segmentation to the UE capability information message. In other words, the entire UE capability information message is segmented into segments having a size of 9,000 bytes, wherein a last segment may be a segment having a remaining size obtained by subtracting a sum of segmented RRC messages from the entire message size. The segmented RRC messages (segmented UE capability information messages) may be transmitted to the base station 1e-02 one by one. In operation 1e-20, after receiving all of the segmented RRC messages (segmented UE capability information messages) from the UE 1e-01, the base station 1e-02 may reconstruct the entire UE capability information by decoding and reassembling the received segmented messages.

Figure 1F:
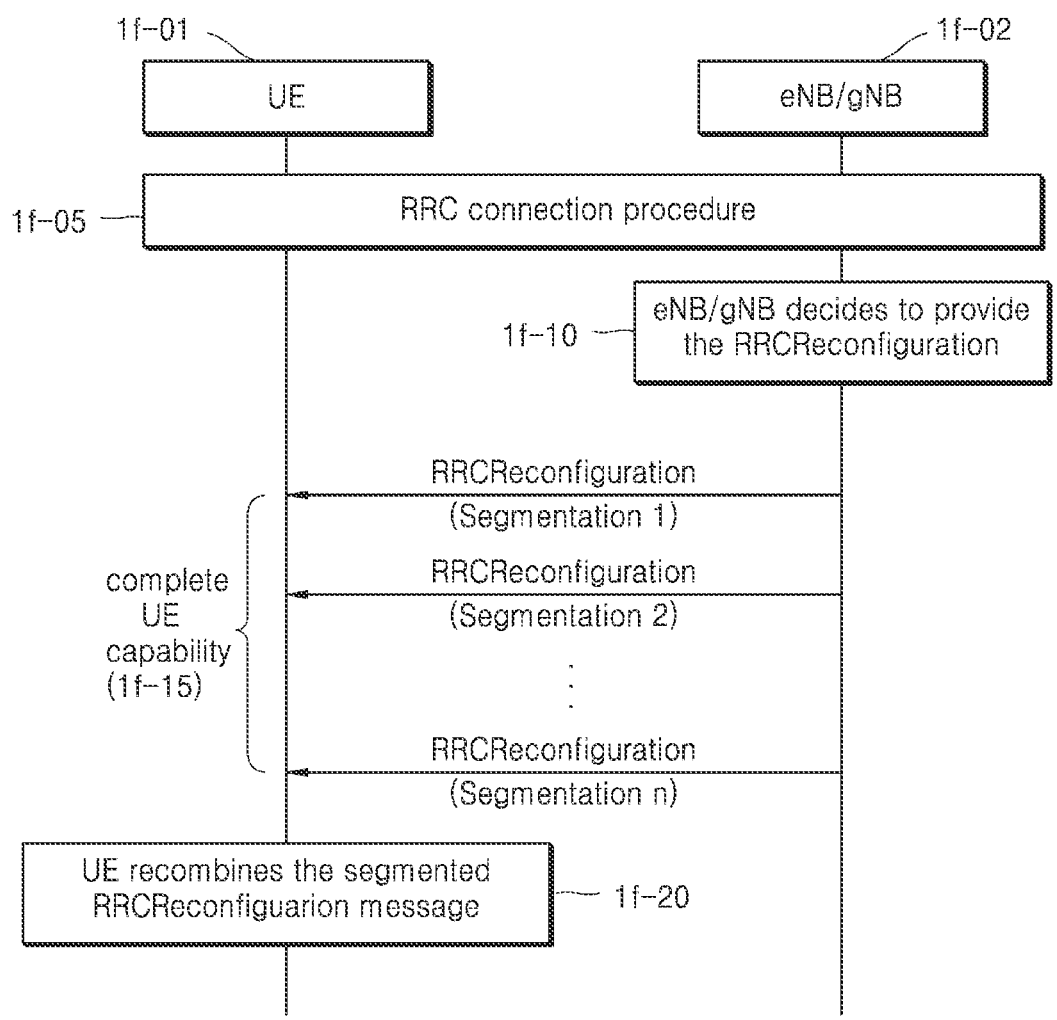
FIG. 1F is a diagram of a method of applying segmentation to a radio resource control (RRC) message via a downlink in an NR system, according to an embodiment of the present disclosure.

FIG. 1F is a diagram of a method of applying segmentation to an RRC message via a downlink in an NR system, according to an embodiment of the present disclosure. According to an embodiment of the present disclosure, the RRC message may include an RRCReconfiguration message, but is not limited thereto, and may include a specific downlink RRC message required to be segmented due to a large size.

According to an embodiment of the present disclosure, a terminal (UE) 1f-01 may receive configuration information for transmitting or receiving data to or from a serving base station (eNB or gNB 1f-02), while being connected to the base station 1f-02, in operation 1f-05. In operation 1f-10, the base station 1f-02 determines whether to transmit, to the UE 1f-01, the RRCReconfiguration message and generate information corresponding to the RRCReconfiguration message. When the RRC message exceeds 9,000 bytes that is a largest size of a PDCP PDU, segmentation is applied to the RRC message (for example, the RRCReconfiguration message). In other words, the entire RRCReconfiguration message is segmented into segments having the size of 9,000 bytes, and a last segment may be a segment having a remaining size obtained by subtracting a sum of the segmented RRC messages from the entire message size. In operation 1f-15, the segmented RRC messages (segmented RRCReconfiguration messages) may be transmitted to the UE 1f-01 one by one. In operation 1f-20, after receiving all of the segmented RRC messages, the UE 1f-01 may reconstruct entire RRC message information by decoding and reassembling the received segmented RRC messages.

Hereinafter, in FIGS. 1G and 1H, segmentation methods applied when a size of a UE capability information message exceeds 9,000 bytes will be described.

Figure 1G:
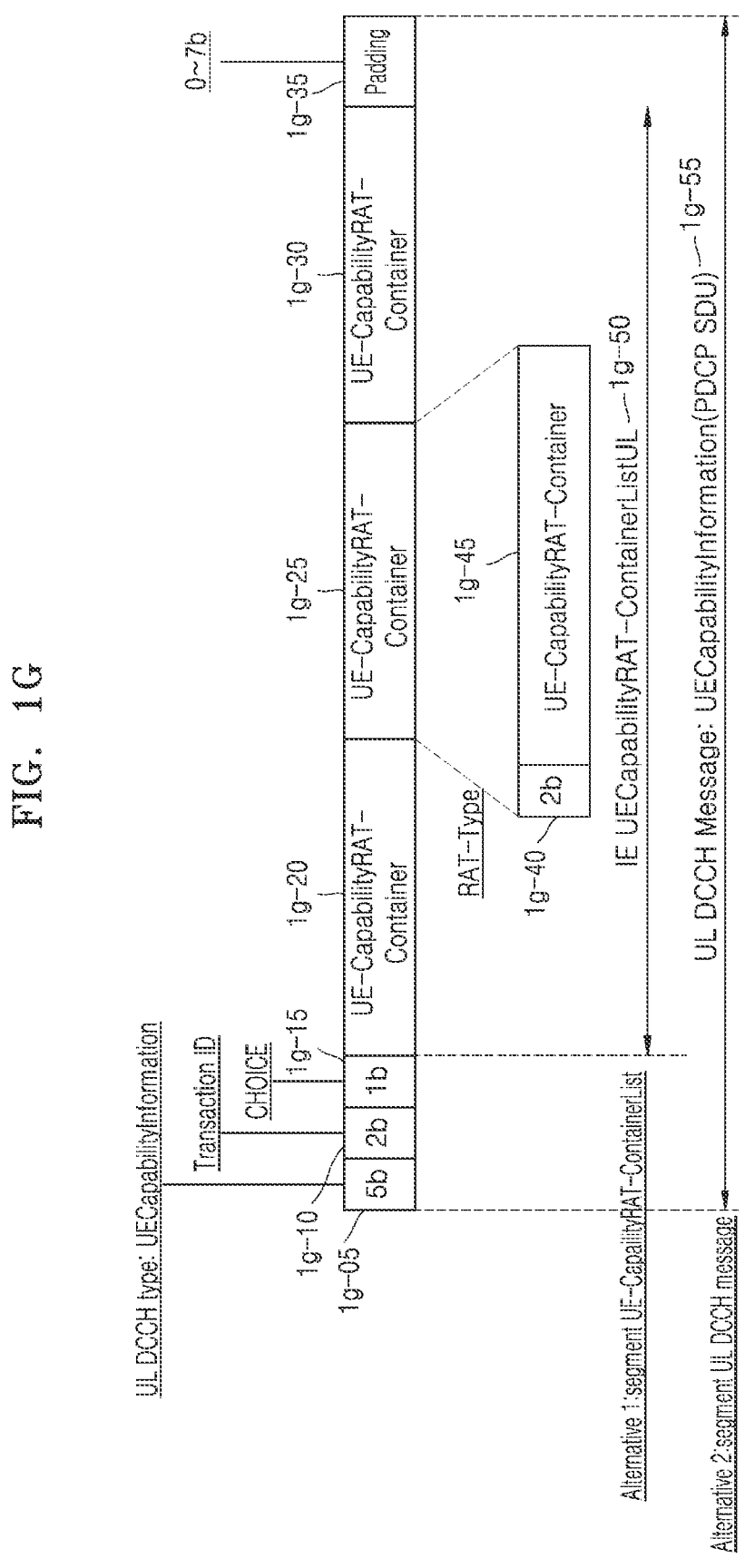

FIG. 1G is a diagram of a method of applying segmentation to a UE capability information message in an NR system, according to an embodiment of the present disclosure.

According to an embodiment of the present disclosure, the UE capability information message is one of uplink (UL) dedicated control channel (DCCH) messages, and a message structure and a bit actually encoded by applying an encoding rule in ASN.1 code are as follows. In other words, a UL DCCH message 1g-05 requires total 5 bits because 1 bit is required for a CHOICE structure 1g-15 and 4 bits are required for a structure of selecting UECapabilityInformation. Also, transaction ID 1g-10 (2 bits) included in the UECapabilityInformation message, and the CHOICE structure 1g-15 (1 bit) are considered. The transaction ID 1g-10 is introduced for mapping of a request and response of an RRC message, and is included as a part of uplink/downlink RRC messages. Then, pieces of UE-CapabilityRAT-Container 1g-20, 1g-25, and 1g-30 suitable for respective RAT types included in UE-CapabilityRAT-ContainerList are included, and may be byte-aligned as a padding bit 1g-35 is included at the end. The pieces of UE-CapabilityRAT-Container 1g-20, 1g-25, and 1a-30 actually include RAT-type information 1g-40 of 2 bits and UE-CapabilityRAT-Container information 1g-45.

Examples of a method of segmenting the UE capability information message of FIG. 1G largely include two methods below.

1. Segment UE-CapabilityRAT-ContainerList 1g-50: A method of segmenting a UECapabilityInformation message included in a UL DCCH, in particular, UE-CapabilityRAT-ContainerList that is a detailed information element (IE).

2. Segment UL DCCH Message 1g-55: A method of segmenting an entire UL DCCH encoding result.

For reference, a structure of each message in the ASN.1 code is shown below,

```
UL-UCCH-Message ::=        SEQUENCE {
   message                    UL-DCCH-MessageType
}
UL-DCCH-MessageType ::=    CHOICE {
   c1                         CHOICE {
      measurementReport          MeasurementReport,
      rrcReconfigurationComplete RRCReconfigurationComplete,
      rrcSetupComplete           RRCSetupComplete,
      rrcReestablishmentComplete RRCReestablishmentComplete,
      rrcResumeComplete          RRCResumeComplete,
      securityModeComplete       SecurityModeComplete,
      securityModeFailure        SecurityModeFailure,
      ulInformationTransfer      ULInformationTransfer,
      locationMeasurementIndication LocationMeasurementIndication,
      ueCapabilityInformation    UECapabilityInformation,
      counterCheckResponse       CounterCheckResponse,
      ueAssistanceInformation    UEAssistanceInformation,
      failureInformation         FailureInformation,
      spare3 NULL,
      spare2 NULL, spare1 NULL
   },
   messageClassExtension      SEQUENCE { }
}
UECapabilityInformation ::= SEQUENCE {
   rrc-TransactionIdentifier  RRC-TransactionIdentifier,
   criticalExtensions         CHOICE {
```

-continued

```
    ueCapabilityInformation          UECapabilityInformation-IEs,
    criticalExtensionsFuture         SEQUENCE { }
    }
}
UECapabilityInformation-IEs ::=   SEQUENCE {
    ue-CapabilityRAT-ContainerList   UE-CapabilityRAT-ContainerList
OPTIONAL,
    lateNonCriticalExtension         OCTET STRING
OPTIONAL,
    nonCriticalExtension             SEQUENCE{ }
OPTIONAL
}
UE-CapabilityRAT-ContainerList ::=SEQUENCE (SIZE (0..maxRAT-
CapabilityContainers)) OF UE-CapabilityRAT-Container
UE-CapabilityRAT-Container ::= SEQUENCE {
    rat-Type                         RAT-Type,
    ue-CapabilityRAT-Container       OCTET STRING
}
```

Figure 1H:
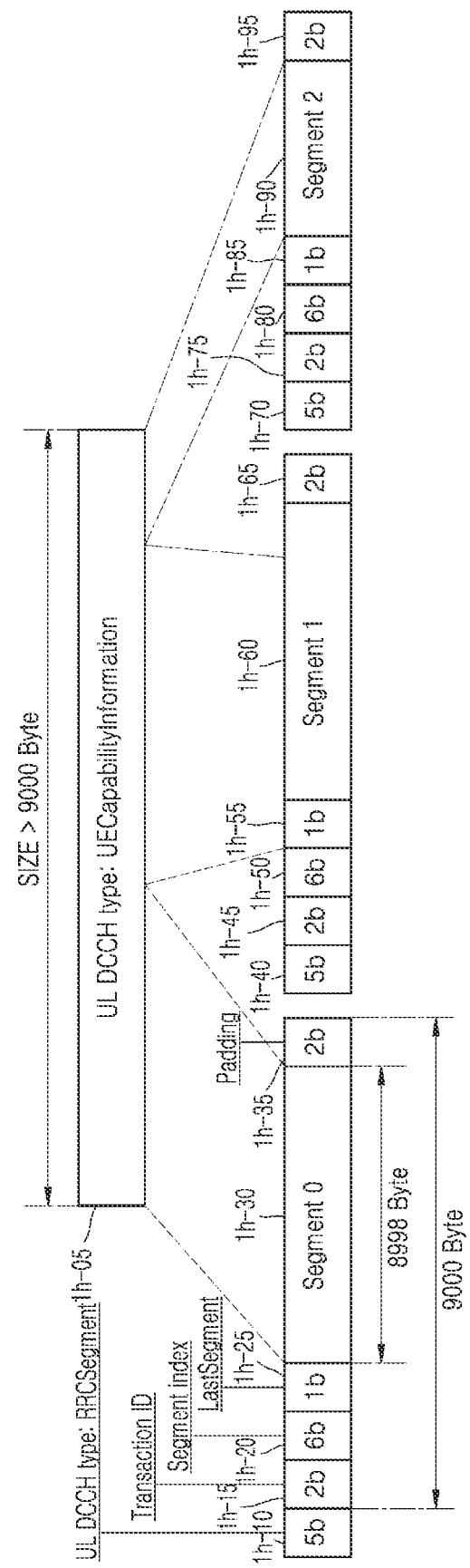
FIG. 1H is a detailed diagram of a method of applying segmentation to a UE capability information message in an NR system, according to an embodiment of the present disclosure.

FIG. 1H is a detailed diagram of a method of applying segmentation to a UE capability information message in an NR system, according to an embodiment of the present disclosure. While an overall method has been described in FIG. 1G, a detailed structure of a segmented message will be described in FIG. 1H.

When UL DCCH-based segmentation is applied and a UL DCCH 1h-05 exceeds 9,000 bytes, a corresponding message may be segmented to 8,998 bytes or 8,999 bytes as in 1h-30 and 1h-60, and a segmented UE capability information message header of 2 bytes or 1 byte is added thereto. Also, a last segment message 1h-90 may have a size obtained by subtracting a sum of sizes of segments having a length of 9,000 bytes from an entire size.

A header of the segmented UE capability information message requires 5 bits for a UL DCCH type configuration 1h-10, 1h-40, or 1h-70 (a number of bits required for CHOICE structure and UECapabilityInformation message indication), and 2 bits for transaction ID 1h-15, 1h-45, or 1h-75 used for the corresponding segmented UE capability information message. Because the transaction ID 1h-15, 1h-45, or 1h-75 is also included in the UE capability information, the transaction ID 1h-15, 1h-45, or 1h-75 may be omitted. Alternatively, the transaction ID 1h-15, 1h-45, or 1h-75 may need to be always present and indicated in a same value in all segmented RRC messages. In addition, the header of the segmented UE capability information message may include an identifier 1h-20, 1h-50, or 1h-80 indicating which segment the corresponding segmented RRC message is. Because segments are transmitted in sequence via PDCP SNs, the identifiers 1h-20, 1h-50, and 1h-80 are always included, but alternatively, the identifiers 1h-20, 1h-50, and 1h-80 may not be included. Instead, an indicator 1h-25, 1h-55, or 1h-85 of 1 bit indicating whether a specific segment is a final segment needs to be included in the corresponding header. When a LastSegment indicator is 0 to indicate that the specific segment is not the final segment, a base station receiving a corresponding message may determine that a corresponding packet has a largest size. A padding bit 1h-35, 1h-65, or 1h-95 for byte-aligning a packet may be added. According to an embodiment of the present disclosure, the padding bit 1h-35, 1h-65, or 1h-95 may vary depending on a previous header bit and a segment size.

According to an embodiment of the present disclosure, in the above-described method of fitting up a size, when a size of a PDCP PDU is adjusted to 9,000 bytes, segmentation is performed while leaving a bit for a PDCP SN.

When segmentation is applied to uplink/downlink RRC messages, in particular, a UE capability information message for an uplink and an RRC reconfiguration message for a downlink, and a corresponding message is transmitted via a signaling radio bearer (SRB) 1 that is an existing transmission method, another RRC message may be unable to be transmitted via the SRB 1 until all segments are transmitted via the SRB 1. In this regard, embodiments of the present disclosure below propose operations for solving such an issue.

FIG. 11 is a diagram of operations for describing a phenomenon in which, when a segmented RRC message is transmitted via a signaling radio bearer (SRB) 1, transmission of a newly generated RRC message is blocked, according to an embodiment of the present disclosure.

In an RRC layer 1i-01, after a specific RRC message 1i-05 (for example, a UE capability information message for an uplink and an RRC reconfiguration message for a downlink) is generated, segmentation may be applied to the RRC message 1i-05 to configure a plurality of segments 1i-06, 1i-07, 1i-08, 1i-09, and 1i-10 when the RRC message 1i-05 exceeds a largest size (9,000 bytes) of a PDCP PDU. In other words, the entire RRC message 1i-05 is segmented into the segments 1i-6, 1i-07, 1i-08, and 1i-09 having a size of 9,000 bytes, and the last segment 1i-10 may be generated as a segment having a remaining size obtained by subtracting a sum of the segmented RRC messages (the segments) 1i-6, 1i-07, 1i-08, and 1i-09 having the size 9,000 bytes from the entire message size (the RRC message) 1i-05.

The segmented RRC messages 1i-06, 1i-07, 1i-08, 1i-09, and 1i-10 generated in the RRC layer 1i-01 may be transmitted by being transferred to lower layers (PDCP, RLC, MAC, and PHY layers). In particular, an RRC packet may be mapped according to a type of a radio bearer to be transmitted to be used for actual transmission in a lower layer. Because the segmented RRC messages 1i-06, 1i-07, 1i-08, 1i-09, and 1i-10 are an RRC message, the segmented RRC messages 1i-06, 1i-07, 1i-08, 1i-09, and 1i-10 are transmitted via an SRB 1i-02, and a UE capability information message and an RRC reconfiguration message in the NR system are transmitted via an SRB 1. In other words, segments for the UE capability information message and the RRC reconfiguration message are sequentially processed via the SRB 1. When transmission of a segment #1 1i-11 and a segment #2 1i-12 regarding the generated RRC message 1i-05 is completed, a new second RRC message 1i-15 may be generated.

For example, the second RRC message 1i-15 may be a measurement report message for an uplink and may be an RRC release message for a downlink (or another RRC message when transmitted via the SRB 1). A second RRC message 1i-25 needs to be transmitted via the SRB 1, but because segmented RRC messages 1i-20, 1i-21, 1i-22 that have not been transmitted are stacked in a transmission buffer stack, the second RRC message 1i-25 is unable to be transmitted before the un-transmitted segmented RRC messages 1i-20, 1i-21, and 1i-22 are transmitted. In other words, the second RRC message 1i-15 is unable to be actually transmitted but is blocked and stored in a buffer, unless all of segmented RRC messages transmitted via the SRB 1 are transmitted, wherein the segmented RRC messages are previously generated and standing by for transmission.

According to an embodiment of the present disclosure, transmission of an RRC message may indicate transmission from an actual terminal to a base station for an uplink, and transmission from a base station to a terminal for a downlink. Alternatively, the transmission may be transmission from an SRB 1 of a terminal to MAC and PHY layers of the terminal for an uplink, and transmission from an SRB 1 of an actual base station to MAC and PHY layers of the base station for a downlink.

Figure 1I:
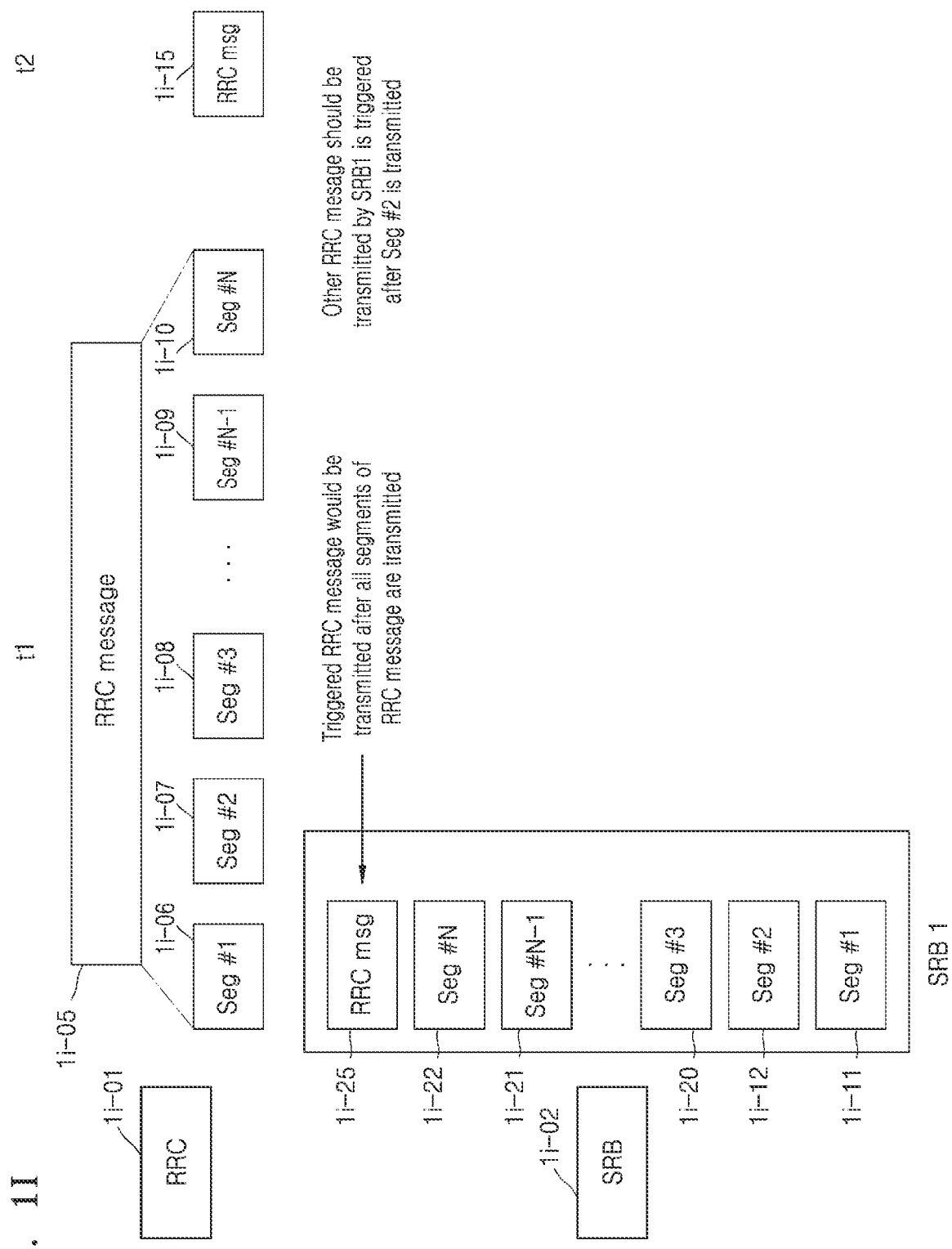
FIG. 1I is a diagram of operations for describing a phenomenon in which, when a segmented RRC message is transmitted via a signaling radio bearer (SRB) 1, transmission of another RRC message is blocked, according to an embodiment of the present disclosure.

As described in FIG. 1I, in the present disclosure, general expressions are used for an RRC message to which segments are applied. Also, in the present disclosure, the segments may be applied to both uplink and downlink RRC messages. Also, the present disclosure proposes a general solution for transmitting a segmented RRC message via an SRB.

For convenience of description, in the present disclosure, application of embodiments of the present disclosure is described based on a UE capability information message as an application example of an uplink, and application of embodiments of the present disclosure is described based on an RRC reconfiguration message as an application example of a downlink. Obviously, the present disclosure is not limited thereto, and different solutions may be applied to the above-described messages. Also, hereinafter, a case in which the UE capability information message is segmented is described. While describing the embodiments below, a general expression and an expression for a specific message may be interchangeably used.

Figure 1J:
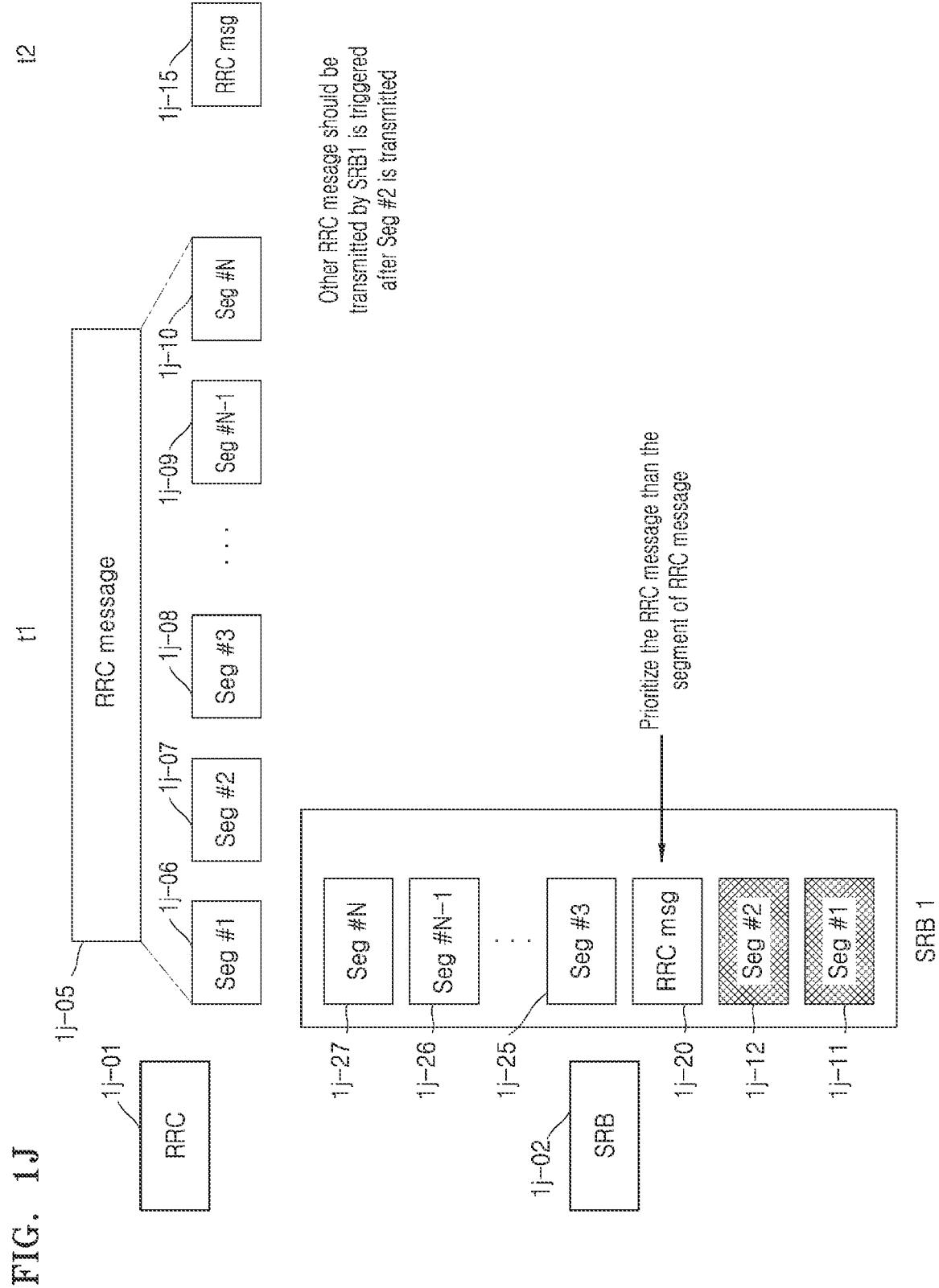
FIG. 1J is a diagram of a method of processing a second RRC message when the second RRC message is newly generated while a segmented RRC message is generated and transmitted via an SRB, according to an embodiment of the present disclosure.

FIG. 1J is a diagram of a method of processing a second RRC message when the second RRC message is newly generated while a segmented RRC message is generated and transmitted via an SRB, according to an embodiment of the present disclosure.

According to an embodiment of the present disclosure, in an RRC layer 1j-01, after a specific RRC message 1j-05 (for example, a UE capability information message for an uplink and an RRC reconfiguration message for a downlink) is generated, segmentation may be applied to the RRC message 1j-05 to configure a plurality of segments 1j-06, 1j-07, 1j-08, 1j-09, and 1j-10 when the RRC message 1j-05 exceeds a largest size (9,000 bytes) of a PDCP PDU. In other words, the entire RRC message 1j-05 is segmented into the segments 1j-6, 1j-07, 1j-08, and 1j-09 having a size of 9,000 bytes that is the size of the PDCP PDU, and the last segment 1j-10 may be generated as a segment having a remaining size obtained by subtracting a sum of the segmented RRC messages (the segments) 1j-6, 1j-07, 1j-08, and 1j-09 having the size 9,000 bytes from the entire message size (the RRC message) 1j-05.

The segmented RRC messages 1j-06, 1j-07, 1j-08, 1j-09, and 1j-10 generated in the RRC layer 1j-01 may be transmitted by being transferred to lower layers (PDCP, RLC, MAC, and PHY layers). In particular, a corresponding RRC packet may be mapped according to a type of a radio bearer to be transmitted to be used for actual transmission in a lower layer. Because the segmented RRC messages 1j-06, 1j-07, 1j-08, 1j-09, and 1j-10 are an RRC message, the segmented RRC messages 1j-06, 1j-07, 1j-08, 1j-09, and 1j-10 are transmitted via an SRB 1j-02, and a UE capability information message and an RRC reconfiguration message in the NR system may be transmitted via an SRB 1. In other words, segments for the UE capability information message and the RRC reconfiguration message are sequentially processed via the SRB 1. When transmission of a segment #1 1j-11 and a segment #2 1j-12 regarding the generated RRC message 1j-05 is completed, a new second RRC message 1j-15 may be generated.

For example, the second RRC message 1j-15 may be a measurement report message for an uplink and may be an RRC release message for a downlink (or another RRC message when transmitted via the SRB 1). A second RRC message 1j-20 needs to be transmitted via the SRB 1, but according to an existing procedure, because segmented RRC messages 1j-25, 1j-26, and 1j-27 that have not been transmitted are stacked in a transmission buffer stack as described with reference to FIG. 11, the second RRC message 1j-20 is unable to be transmitted before the un-transmitted segmented RRC messages 1j-25, 1j-26, and 1j-27 are transmitted.

According to an embodiment of the present disclosure, the second RRC message 1j-20 is processed with higher priority than the segmented RRC messages 1j-25, 1j-26, and 1j-27. In other words, even when the un-transmitted segmented RRC messages 1j-25, 1j-26, and 1j-27 are stacked in the transmission buffer stack to be transmitted via the SRB 1, transmission of the second RRC message 1j-20 is prioritized when the second RRC message 1j-20 (a message to be transmitted via the SRB 1) having the higher priority is generated. Representative messages having higher priorities over an un-transmitted segmented RRC message may be a measurement report message for an uplink and an RRC release message for a downlink. However, the present disclosure is not limited to the above examples. The UE capability information may be an important message, but the measurement report message may directly affect handover (HO) or connection control of a terminal (UE), and thus needs to be processed first. Other UL DCCH messages transmitted via the SRB 1 may be responses to request messages of a base station and may not be applied to the present case. However, the present disclosure is not limited to the above examples.

Accordingly, when transmission of the segment #1 1j-11 and the segment #2 1j-12 regarding the generated RRC message 1j-15 is completed and the second RRC message 1j-20 is generated, transmission thereof is performed. Then, the remaining un-transmitted segmented RRC messages 1j-25, 1j-26, and 1j-27 are transmitted.

According to an embodiment of the present disclosure, transmission of an RRC message may indicate transmission from an actual terminal to a base station for an uplink, and transmission from a base station to a terminal for a downlink. Alternatively, the transmission via an uplink may be transmission from an SRB 1 of a terminal to MAC and PHY layers of the terminal, and the transmission via a downlink may be transmission from an SRB 1 of a base station to MAC and PHY layers of the base station.

FIG. 1K is a diagram of a method of avoiding an effect on transmission of a second RRC message (message transmitted via an SRB 1) newly generated by transmitting a segmented RRC message via an SRB different from an SRB to which the segmented RRC message was transmitted, according to an embodiment of the present disclosure.

According to an embodiment of the present disclosure, in an RRC layer 1k-01, after a specific RRC message 1k-05 (for example, a UE capability information message for an uplink and an RRC reconfiguration message for a downlink) is generated, segmentation may be applied to the RRC message 1k-05 to configure a plurality of segments 1k-06, 1k-07, 1k-08, 1k-09, and 1k-10 when the RRC message 1k-05 exceeds a largest size (9,000 bytes) of a PDCP PDU. In other words, the entire RRC message 1k-05 is segmented into the segments 1k-6, 1k-07, 1k-08, and 1k-09 having a size of 9,000 bytes as the PDCP PDU, and the last segment 1k-10 may be generated as a segment having a remaining size obtained by subtracting a sum of the segmented RRC messages (the segments) 1k-6, 1k-07, 1k-08, and 1k-09 having the size 9,000 bytes from the entire message size (the RRC message) 1k-05.

The segmented RRC messages 1k-06, 1k-07, 1k-08, 1k-09, and 1k-10 generated in the RRC layer 1k-01 may be transmitted by being transferred to lower layers (PDCP, RLC, MAC, and PHY layers), In particular, a corresponding RRC packet may be mapped according to a type of a radio bearer to be transmitted in a lower layer, Because the segmented RRC messages 1*k*-06, 1*k*-07, 1*k*-08, 1*k*-09, and 1*k*-10 are an RRC message, the segmented RRC messages 1*k*-06, 1*k*-07, 1*k*-08, 1*k*-09, and 1*k*-10 are transmitted via an SRB 1 k-02, and a UE capability information message and an RRC reconfiguration message in the NR system may be transmitted via an SRB 1. In other words, segments for the UE capability information message and the RRC reconfiguration message are sequentially processed via the SRB 1. When transmission of a segment #1 1*k*-11 and a segment #2 1*k*-12 regarding the generated RRC message 1*k*-05 is completed, a new second RRC message 1*k*-15 may be generated.

For example, the second RRC message 1*k*-15 may be a measurement report message for an uplink and may be an RRC release message for a downlink (or another RRC message when transmitted via the SRB 1). A second RRC message 1*k*-20 needs to be transmitted via the SRB 1, but according to an existing procedure, because segmented RRC messages 1*k*-25, 1*k*-26, and 1*k*-27 that have not been transmitted are stacked in a transmission buffer stack as described with reference to FIG. 11, the second RRC message 1*k*-20 is unable to be transmitted before the un-transmitted segmented RRC messages 1*k*-25, 1*k*-26, and 1*k*-27 are transmitted.

According to an embodiment of the present disclosure, in a segmented RRC message, an actual UECapabilityInformation message is transmitted via an SRB 1, but when the UECapabilityInformation message is segmented and transmitted, the segmented UECapabilityInformation message may be transmitted via an SRB 2 or a new SRB n. Accordingly, a case in which a message having a high priority and to be transmitted via the SRB 1 is blocked from being transmitted due to a segmented RRC message is prevented. Representative messages having higher priorities over an un-transmitted segmented RRC message may be a measurement report message for an uplink and an RRC release message for a downlink. However, the present disclosure is not limited to the above examples. In the above method, as in a case where a UEInformationResponse message is transmitted via an SRB 2 when minimization of drive tests (MDT) information includes a log message, when transmission of another RRC message is blocked due to a large size, an RRC message having a large size is transmitted via the SRB 2 (or the new SRB n) such as to allow transmission of a more important RRC message via, in particular, the SRB 1.

Accordingly, when the second RRC message 1*k*-20 is generated after transmission of the segment #1 1*k*-11 and segment #2 1*k*-12 for the generated RRC message 1*k*-15 via the SRB 2 (or the new SRB n) is completed, the transmission of the second RRC message 1*k*-20 is performed via the SRB 1. Then, the un-transmitted segmented RRC messages 1*k*-25, 1*k*-26, and 1*k*-27 are transmitted via the SRB 2 (or the new SRB n).

According to an embodiment of the present disclosure, transmission of an RRC message may indicate transmission from an actual terminal to a base station for an uplink, and transmission from a base station to a terminal for a downlink. Alternatively, the transmission may be transmission from an SRB 1 of a terminal to MAC and PHY layers of the terminal for an uplink, and transmission from an SRB 1 of a base station to MAC and PHY layers of the base station for a downlink.

FIG. 1L is a diagram of an overall flowchart related to operations when another RRC message to be transmitted via an SRB 1 is generated while transmitting an uplink segmentation message, according to an embodiment of the present disclosure.

According to an embodiment of the present disclosure, a terminal (UE) 1*l*-01 reports, to a serving base station (eNB or gNB) 1*l*-02, a capability supported by the UE 1*l*-01 while being connected to the base station (eNB or gNB 1*l*-02). In operation 1*l*-05, the base station 1*l*-02 determines whether it is required to request the UE 1*l*-01, in a connected state, for capability information. The determining in operation 1*l*-05 may be performed by an indication (failure to retrieve UE capability) from a core network or by determination of the base station 1*l*-02. In operation 1*l*-10, the UE 1*l*-01 receives, from the base station 1*l*-02, a request (UECapabilityEnquiry message) to report UE capability information, and the UECapabilityEnquiry message may include filtering information (RAT type, frequency information, or the like) of the UE capability information. Upon receiving the UECapabilityEnquiry message, the UE 1*l*-01 generates a UE capability information message in response to the UE capability request of the base station 1*l*-02, and when the UE capability information message exceeds 9,000 bytes that is a largest size of PDCP PDU, applies segmentation to the UE capability information message. In other words, the entire UE capability information message is segmented into segments having a size of 9,000 bytes, wherein a last segment may be a segment having a remaining size obtained by subtracting a sum of segmented RRC messages from the entire message size. The segmented RRC messages (segmented UE capability information messages) may be transmitted to the base station 1*l*-02 one by one. In operation 1*l*-15, the UE 1*l*-01 transmits segments 1 and 2 among the segmented UE capability information. Then, in operation 1*l*-20, an RRC message to be transmitted via an SRB 1 may be generated, and the RRC message to be transmitted via the SRB 1 may be transmitted according to a first embodiment (FIG. 1J) and a second embodiment (FIG. 1K), In other words, according to the first embodiment, when a new RRC message is generated while the segmented UE capability information messages are transmitted, the new RRC message is first transmitted. Also, according to the second embodiment, the segmented UE capability information messages are always transmitted via an SRB 2 or another SRB n, and the new RRC message is transmitted via the SRB 1.

According to an embodiment of the present disclosure, an example of the new RRC message may include a MeasurementReport message. The UE 1*l*-01 transmits un-transmitted remaining segmented UE capability information messages in operation 1*l*-30, and after receiving all of the segmented RRC messages (segmented UE capability information messages) from the UE 1*l*-01, the base station 1*l*-02 may reconstruct entire UE capability information by decoding and reassembling the received segmented messages, in operation 1*l*-35.

Figure 1M:
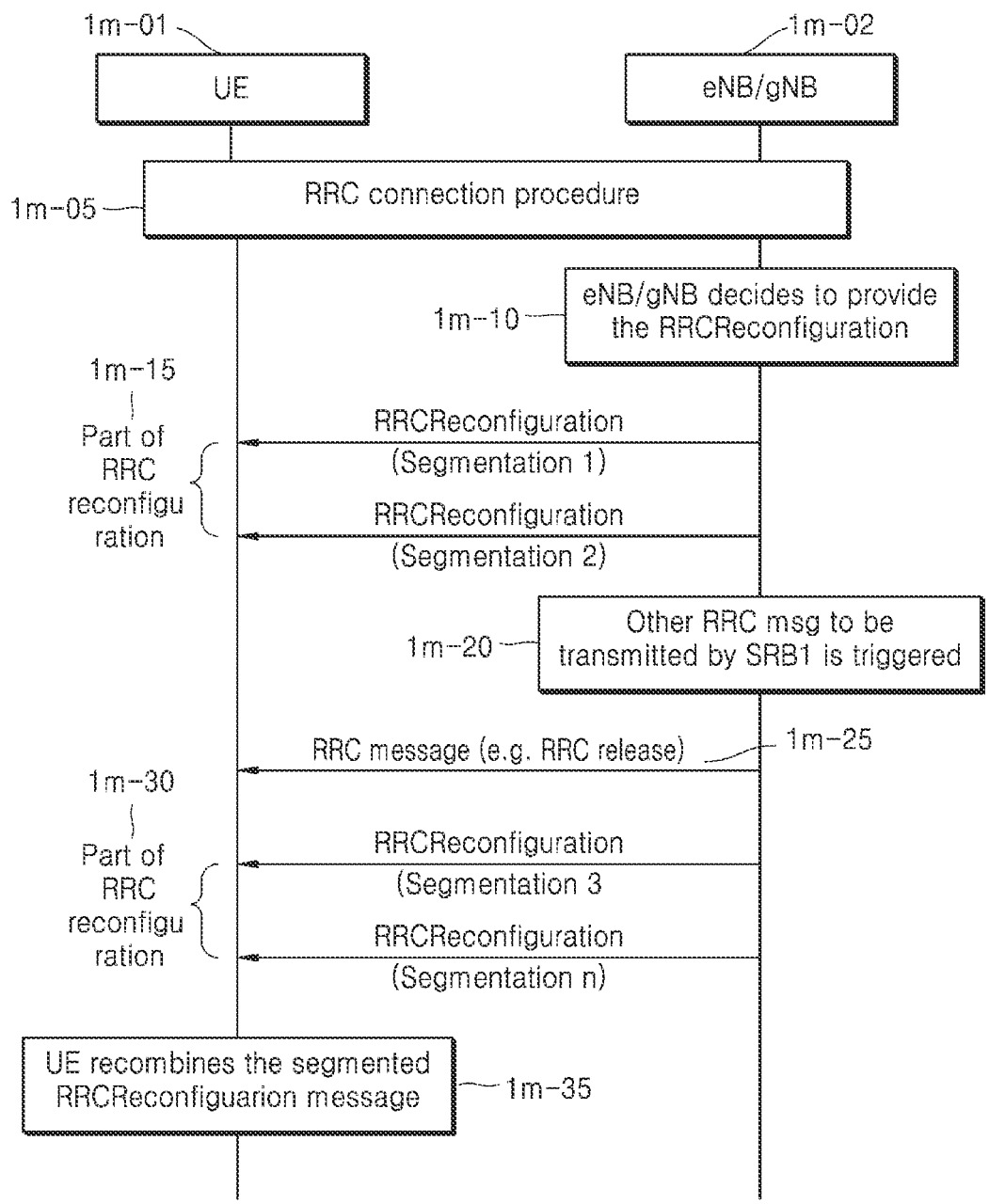
FIG. 1M is a diagram of an overall flowchart related to operations when another RRC message to be transmitted via an SRB 1 is generated while transmitting a downlink segmentation message, according to an embodiment of the present disclosure.

FIG. 1M is a diagram of an overall flowchart related to operations when another RRC message to be transmitted via an SRB 1 is generated while transmitting a downlink segmentation message, according to an embodiment of the present disclosure.

According to an embodiment of the present disclosure, a terminal (UE) 1*m*-01 needs to receive configuration information for transmitting or receiving data to or from a serving base station (eNB or gNB 1*m*-02), while being connected to the base station (eNB or gNB 1*m*-02), in operation 1*m*-05. In operation 1*m*-10, the base station 1*m*-02 determines whether to transmit, to the UE 1m-01, an RRCReconfiguration message and generate information corresponding to the RRCReconfiguration message. When the RRC message exceeds 9,000 bytes that is a largest size of a PDCP PDU, segmentation is applied to the RRC message (for example, the RRCReconfiguration message). In other words, the entire RRCReconfiguration message is segmented into segments having the size of 9,000 bytes, and a last segment may be a segment having a remaining size obtained by subtracting a sum of the segmented RRC messages from the entire message size. The base station 1m-02 generates the RRCReconfiguration message, and when the RRCReconfiguration message exceeds 9,000 bytes that is the largest size of PDCP PDU, applies segmentation to the RRCReconfiguration message. In other words, the entire UE RRCReconfiguration message is segmented into segments having the size of 9,000 bytes, and a last segment may be a segment having a remaining size obtained by subtracting a sum of the segmented RRC messages from the entire message size. The segmented RRC messages (segmented RRCReconfiguration messages) may be transmitted to the UE 1m-01 one by one. In operation 1m-25, the base station 1m-02 transmits a segment 1 and a segment 2 among the segmented RRCReconfiguration messages. Then, in operation 1m-20, a new RRC message to be transmitted via an SRB 1 may be generated, and the new RRC message to be transmitted via the SRB 1 may be transmitted according to the first embodiment (FIG. 1J) and the second embodiment (FIG. 1K). In other words, according to the first embodiment, when a new RRC message is generated while the segmented RRCReconfiguration messages are transmitted, the new RRC message is first transmitted. Also, according to the second embodiment, the segmented RRCReconfiguration messages are always transmitted via an SRB 2 or another SRB n, and the new RRC message is transmitted via the SRB 1.

According to an embodiment of the present disclosure, an example of the new RRC message may include an RRCRelease message. The base station 1m-02 transmits un-transmitted remaining segmented RRCReconfiguration messages in operation 1m-30, and after receiving all of the segmented RRC messages (segmented UE RRCReconfiguration messages) from the base station 1m-02, UE (1m-01) may reconstruct entire RRCReconfiguration information by decoding and reassembling the received segmented messages, in operation 1m-35, FIG. 1N is a diagram of operations of a UE for processing a second RRC message when the second RRC message is newly generated while a segmented RRC message (UE capability information message) is generated and transmitted via an SRB, according to an embodiment of the present disclosure.

The UE performs an RRC connection procedure with a serving base station in operation 1n-05, and reports, to the base station, capability supported by the UE. In other words, in operation 1n-10, the UE receives, from the base station, a request (UECapabilityEnquiry message) to report UE capability information, and the UECapabilityEnquiry message may include filtering information (RAT type, frequency information, or the like) of the UE capability information. Upon receiving the UECapabilityEnquiry message, the UE generates a UE capability information message in response to the UE capability request of the base station, and when the UE capability information message exceeds 9,000 bytes that is a largest size of PDCP PDU, applies segmentation to the UE capability information message, in operation 1n-15. In other words, the entire UE capability information message is segmented into segments having a size of 9,000 bytes, wherein a last segment may be a segment having a remaining size obtained by subtracting a sum of segmented RRC messages from the entire message size. In operation 1n-20, the segmented RRC message (segmented UE capability information message) may be transmitted to the base station one by one. In operation 1n-25, the UE transmits the segmented UE capability information message via an SRB 1. When a new RRC message is generated during the transmission of the segmented UE capability information message in operation 1n-30, the generated message is first transmitted via the SRB 1 in operation 1n-35. Then, the UE transmits the remaining segmented UE capability information messages that have not been transmitted, in operation 1n-40. When the new RRC message is not generated during the transmission of the segmented UE capability information message in operation 1n-30, the remaining segmented UE capability information messages are transmitted via the SRB 1, in operation 1n-45.

The above operations may also be applied for a downlink, and in this case, RRC reconfiguration may be applied instead of UE capability information.

FIG. 10 is a diagram of operations of a UE for avoiding an effect on transmission of a second RRC message (message transmitted via an SRB 1) newly generated by transmitting a segmented RRC message via an SRB different from an SRB to which the segmented RRC message was transmitted, according to an embodiment of the present disclosure.

The UE performs an RRC connection procedure with a serving base station in operation 1o-05, and reports, to the base station, capability supported by the UE. In other words, in operation 1o-10, the UE receives, from the base station, a request (UECapabilityEnquiry message) to report UE capability information, and the UECapabilityEnquiry message may include filtering information (RAT type, frequency information, or the like) of the UE capability information. Upon receiving the UECapabilityEnquiry message, the UE generates a UE capability information message in response to the UE capability request of the base station, and when the UE capability information message exceeds 9,000 bytes that is a largest size of PDCP PDU, applies segmentation to the UE capability information message, in operation 1o-15. In other words, the entire UE capability information message is segmented into segments having a size of 9,000 bytes, wherein a last segment may be a segment having a remaining size obtained by subtracting a sum of segmented RRC messages from the entire message size. In operation 1o-20, the segmented RRC messages (segmented UE capability information messages) may be transmitted to the base station one by one via an SRB 2 or a new SRB n. In operation 1o-25, the UE may transmit the segmented UE capability information messages via the SRB 2 or the new SRB n When a new RRC message is generated during transmission of the segmented UE capability information messages in operation 1o-30, the new RRC message is transmitted via the SRB 1 and the remaining segmented UE capability information messages are transmitted via the SRB 2 at the same time or regardless of an order, in operation 1o-35. When the new RRC message is not generated during the transmission of the segmented UE capability information messages in operation 1o-30, the remaining segmented UE capability information messages are transmitted via the SRB 2, in operation 1o-45.

The above operations may also be applied for a downlink, and in this case, RRC reconfiguration may be applied instead of UE capability information.

Figure 1P:
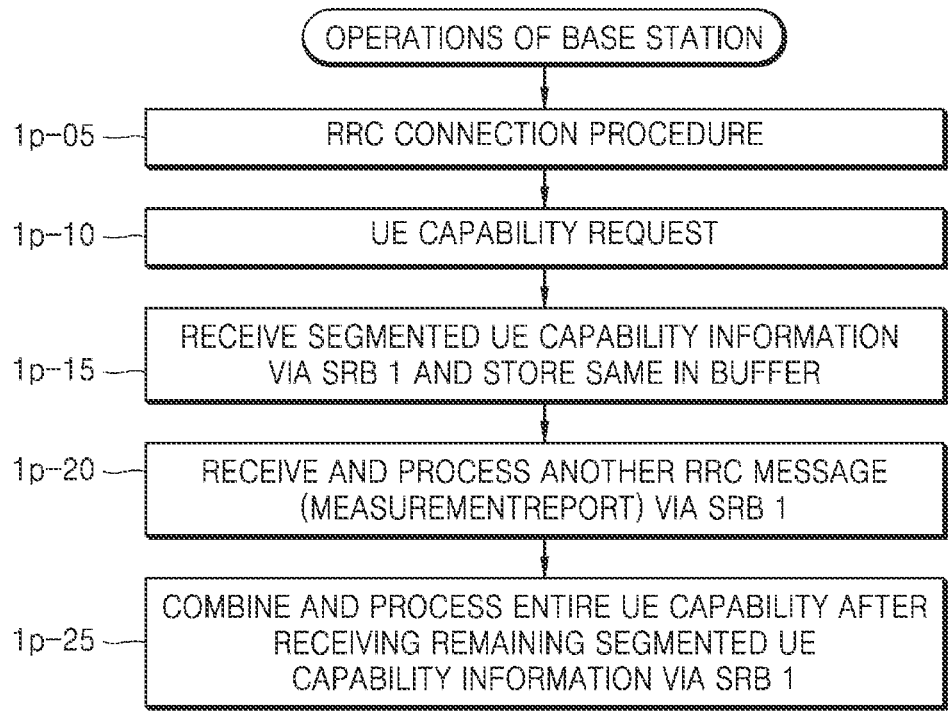
FIG. 1P is a diagram of operations of a base station for processing a second RRC message when the second RRC message is newly generated while a segmented RRC message is generated and transmitted via an SRB, according to an embodiment of the present disclosure.

FIG. 1P is a diagram of operations of a base station for processing a second RRC message when the second RRC message is newly generated while a segmented RRC message (UE capability information message) is generated and transmitted via an SRB, according to an embodiment of the present disclosure.

In operation 1p-05, the base station may perform an RRC connection procedure with a UE and request the UE to report supported capability. In other words, in operation 1p-10, the base station transmits, to the UE, a request (UECapabilityEnquiry message) to report UE capability information, and the UECapabilityEnquiry message may include filtering information (RAT type, frequency information, or the like) of the UE capability information. Then, the base station receives UE capability information via an SRB 1, and stores the same in a buffer (operation 1p-15), A UE capability information message may be a single UE capability information message equal to or less than 9,000 bytes, and may be segmented RRC messages of the UE capability information message. In operation 1p-20, another RRC message (for example, measurement report message) may be received via the SRB 1, and processed. In operation 1p-25, upon receiving the remaining segmented UE capability information via the SRB 1, entire UE capability may be combined and processed to be used for UE configuration or the like afterwards.

Figure 1Q:
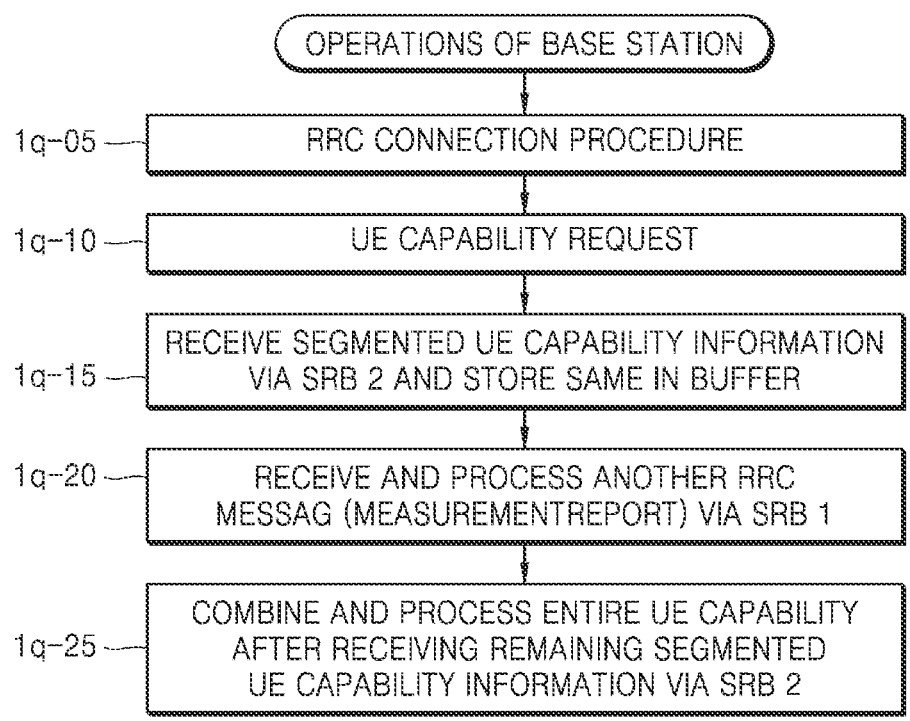
FIG. 1Q is a diagram of operations of a base station for avoiding an effect on transmission of a second RRC message (message transmitted via an SRB 1) newly generated by transmitting a segmented RRC message via an SRB different from an SRB to which the segmented RRC message was transmitted, according to an embodiment of the present disclosure.

FIG. 1Q is a diagram of operations of a base station for avoiding an effect on transmission of a second RRC message (message transmitted via an SRB 1) newly generated by transmitting a segmented RRC message via an SRB different from an SRB to which the segmented RRC message was transmitted, according to an embodiment of the present disclosure.

In operation 1q-05, the base station may perform an RRC connection procedure with a UE and request the UE to report supported capability. In other words, in operation 1q-10, the base station transmits, to the UE, a request (UECapabilityEnquiry message) to report UE capability information, and the UECapabilityEnquiry message may include filtering information (RAT type, frequency information, or the like) of the UE capability information. Then, the base station may receive UE capability information via the SRB 1 and store the same in a buffer, and when a UE capability information message exceeds 9,000 bytes and thus is segmented RRC messages of the UE capability information message, may receive the segmented UE capability information via an SRB 2 and store the same in the buffer (operation 1q-15), In operation 1q-20, another RRC message (for example, measurement report message) may be received via the SRB 1, and processed. At the same time, in operation 1q-25, when the remaining segmented UE capability information is received via the SRB 2, entire UE capability may be combined and processed to be used for UE configuration afterwards.

Figure 1R:
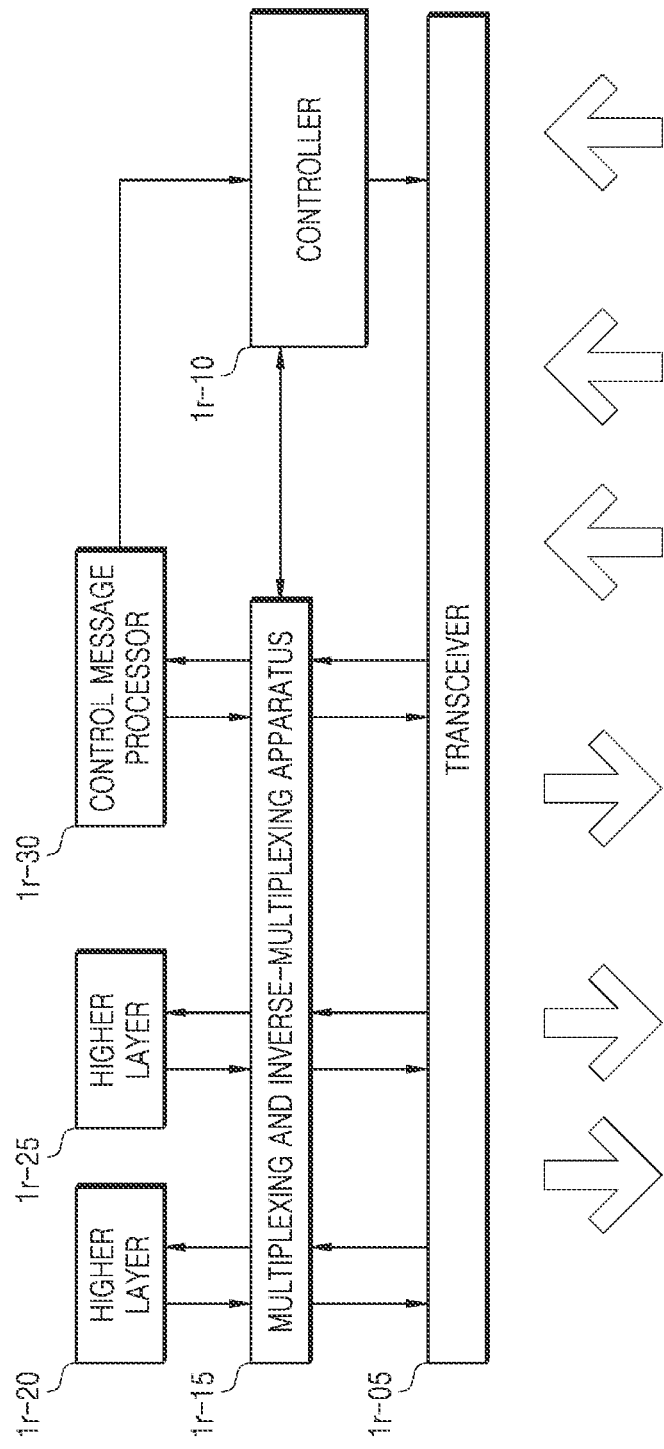
FIG. 1R is a block diagram of a configuration of a terminal, according to an embodiment of the present disclosure.

FIG. 1R is a block diagram of a configuration of a terminal, according to an embodiment of the present disclosure. As shown in FIG. 1R, the terminal according to an embodiment of the present disclosure may include a transceiver 1r-05, a controller 1r-10, a multiplexing and inverse-multiplexing unit 1r-15, various higher layer processors 1r-20 and 1r-25, and a control message processor 1r-30. However, the present disclosure is not limited thereto, and the terminal may include more or fewer components than those shown in FIG. 1R.

The transceiver 1r-05 may receive data and a certain control signal in a forward channel of a serving cell, and transmit data and a certain control signal in an inverse channel. When a plurality of serving cells are configured, the transceiver 1r-05 may perform data transmission/reception and control signal transmission/reception via the plurality of serving cells. The multiplexing and inverse-multiplexing unit 1r-15 may multiplex data generated in the higher layer processors 1r-20 and 1r-25 or control message processor 1r-30, or inverse-multiplex data received from the transceiver 1r-05 to transmit the data to the corresponding higher layer processors 1r-20 and 1r-25 or control message processor 1r-30. The control message processor 1r-30 may receive a control message from a base station and perform an operation corresponding to the control message. For example, the control message processor 1r-30 may include a function of processing a control message, such as an RRC message or an MAC CE, and may receive the RRC message regarding operations of the terminal, a resource pool, and a report of a channel busy ratio (CBR) measurement value, but is not limited thereto. The higher layer processors 1r-20 and 1r-25 denote data radio bearer (DRB) layers and may be configured for each service. Data generated in a user service, such as a file transfer protocol (FTP) or a voice over Internet protocol (VoIP), is processed and transmitted to the multiplexing and inverse-multiplexing unit 1r-15, or data transmitted from the multiplexing and inverse-multiplexing unit 1r-15 is processed and transmitted to a service application of a higher layer. The controller 1r-10 may control the transceiver 1r-05 and the multiplexing and inverse-multiplexing unit 1r-15 such that inverse transmission is performed with suitable transmission resources at a suitable time point, by identifying a scheduling command received via the transceiver 1r-05, for example, inverse grants.

The terminal has been described as including a plurality of blocks, wherein the blocks perform different functions, but this is only an embodiment and is not limited thereto. For example, a function performed by the multiplexing and inverse-multiplexing unit 1r-15 may be performed by the controller 1r-10; and a function performed by the control message processor 1r-30 may be performed by the controller 1r-10. However, the present disclosure is not limited to the above examples, FIG. 1S is a block diagram of a configuration of a base station, according to an embodiment of the present disclosure.

Figure 1S:
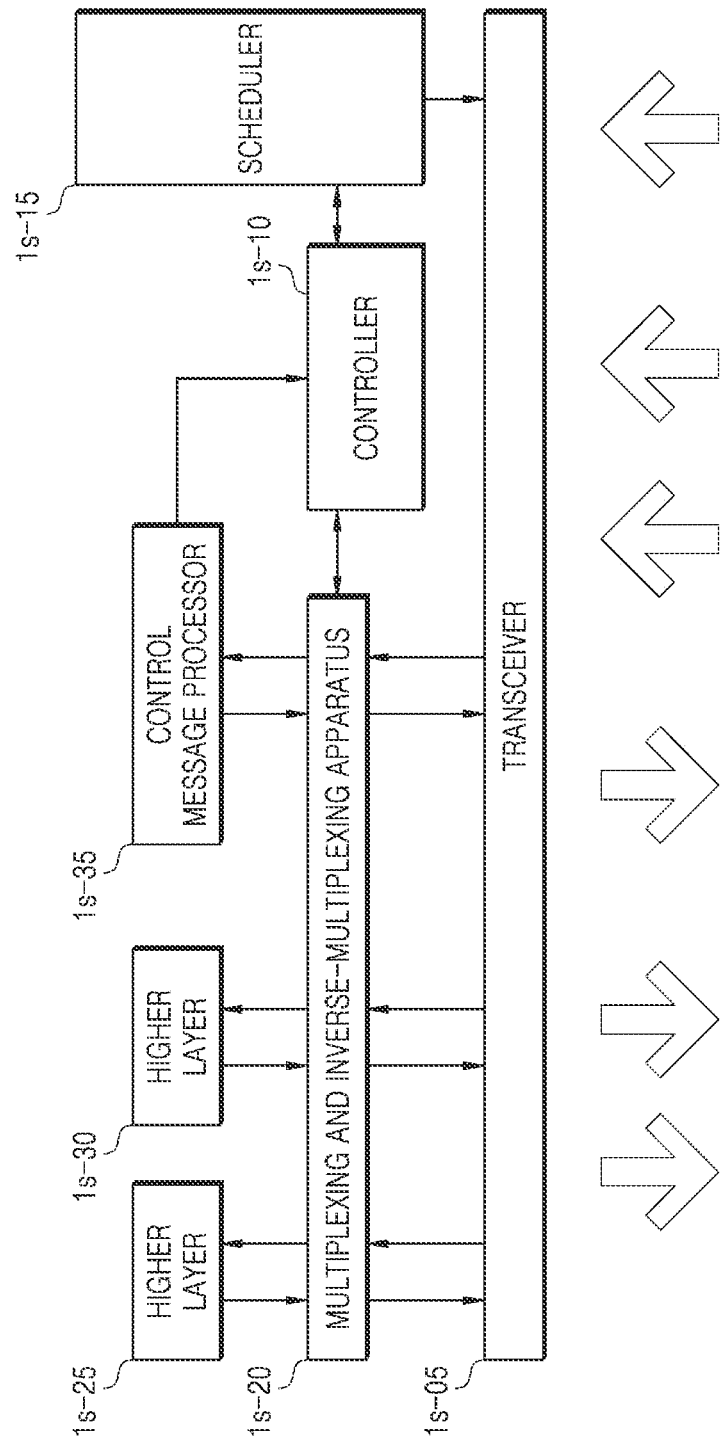
FIG. 1S is a block diagram of a configuration of a base station, according to an embodiment of the present disclosure.

The base station of FIG. 1S may include a transceiver 1s-05, a controller 1s-10, a multiplexing and inverse-multiplexing unit 1s-20, a control message processor 1s-35, various higher layer processors 1s-25 and 1s-30, and a scheduler 1s-15. However, the present disclosure is not limited thereto, and the base station may include more or fewer components than those shown in FIG. 1S.

The transceiver 1s-05 may transmit data and a certain control signal in a forward carrier, and receive data and a certain control signal in an inverse carrier. When a plurality of carriers are configured, the transceiver 1s-05 may perform data transmission/reception and control signal transmission/reception via the plurality of carriers. The multiplexing and inverse-multiplexing unit 1s-20 may multiplex data generated in the higher layer processors 1s-25 and 1s-30 or control message processor 1s-35, or inverse-multiplex data received from the transceiver 1s-05 to transmit the data to the corresponding higher layer processors 1s-25 and 1s-30, the control message processor 1s-35, or the controller 1s-10. The control message processor 1s-35 may generate a message to be transmitted to a UE and transmit the message to a lower layer, based on control by the controller 1s-10, The higher layer processors 1s-25 and 1s-30 may be configured for each service of each UE, and data generated in a user service, such as an FTP or a VoIP, is processed and transmitted to the multiplexing and inverse-multiplexing unit 1s-20, or data transmitted from the multiplexing and inverse-multiplexing unit 1s-20 is processed and transmitted to a service application of a higher layer. The scheduler 1s-15 assigns a transmission resource to the UE in consideration of a buffer status, channel status, and active time of the UE, and processes the transceiver 1s-05 to process a signal transmitted by the UE or transmit a signal to the UE.

The base station has been described as including a plurality of blocks, wherein the blocks perform different functions, but this is only an embodiment and is not limited thereto. For example, a function performed by the multiplexing and inverse-multiplexing unit 1s-20 may be performed by the controller 1s-10, a function performed by the control message processor 1s-35 may be performed by the controller 1s-10, and a function performed by the scheduler 1s-15 may be performed by the controller 1s-10. However, the present disclosure is not limited to the above examples.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to specific embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Meanwhile, the embodiments of the present disclosure described with reference to the present specification and the drawings are merely illustrative of specific examples to easily facilitate description and understanding of the present disclosure, and are not intended to limit the scope of the present disclosure. In other words, it will be apparent to one of ordinary skill in the art that other modifications based on the technical ideas of the present disclosure are feasible. Also, the embodiments may be combined with each other as required. For example, a portion of one embodiment of the present disclosure and a portion of another embodiment of the present disclosure may be combined with each other to enable a base station and a terminal to operate. Further, the embodiments of the present disclosure are also applicable to another communication system, and other modifications based on technical ideas of the embodiments are also feasible.

The invention claimed is:

1. A method of reporting user equipment (UE) capability information, the method comprising:

receiving a UE capability information request message from a base station;

generating a UE capability information message, based on the received UE capability information request message;

determining whether the generated UE capability information message exceeds a configured largest size of a packet data convergence protocol (PDCP) protocol data unit (PDU);

segmenting the generated UE capability information message into a plurality of segments, based on a result of the determining; and transmitting at least one of the plurality of segments to the base station, wherein transmitting the at least one of the plurality of segments to the base station comprises transmitting the plurality of segments via a signaling radio bearer (SRB) 2 and transmitting a radio resource control (RRC) message via an SRB 1, wherein transmitting the at least one of the plurality of segments to the base station comprises:

transmitting, to the base station via the SRB 1, a first segment from among the plurality of segments generated by segmenting the UE capability information message;

generating an RRC message to be transmitted via the SRB 1; and transmitting the generated RRC message first before a second segment from among the plurality of segments generated by segmenting the UE capability information message is transmitted, based on a priority of the generated RRC message.

2. The method of claim 1, wherein segmenting the generated UE capability information message comprises segmenting UE-CapabilityRAT-ContainerList in the generated UE capability information message into the plurality of segments or segmenting a result of encoding the entire UE capability information message into the plurality of segments, wherein sizes of the plurality of segments are remaining sizes obtained by excluding a message header size from the configured largest size of the PDCP PDU.

3. The method of claim 1, further comprising:

receiving, from the base station, a plurality of segments generated by segmenting an RRC reconfiguration message; and reassembling the plurality of segments.

4. The method of claim 3, wherein receiving, from the base station, the plurality of segments generated by segmenting the RRC reconfiguration message comprises:
receiving, from the base station via the SRB 1, a first segment from among the plurality of segments generated by segmenting the RRC reconfiguration message; and
receiving an RRC message via the SRB 1, after the first segment is received and before a second segment is received.

5. The method of claim 3, wherein receiving, from the base station, the plurality of segments generated by segmenting the RRC reconfiguration message comprises receiving the plurality of segments via the SRB 2 and receiving an RRC message via the SRB 1.

6. A method of obtaining user equipment (UE) capability information, the method comprising:
transmitting a UE capability information request message to a UE;
receiving, from the UE, a plurality of segments generated by segmenting a UE capability information message;
storing the plurality of segments in a buffer; and
reassembling the plurality of segments,
wherein receiving, from the UE, the plurality of segments generated by segmenting the UE capability information message comprises receiving the plurality of segments via a signaling radio bearer (SRB) 2 and receiving a radio resource control (RRC) message via an SRB 1, and
wherein receiving, from the UE, the plurality of segments generated by segmenting the UE capability information message further comprises:
receiving, from the UE via the SRB 1, a first segment from among the plurality of segments generated by segmenting the UE capability information message; and
receiving the RRC message via the SRB 1, after the first segment is received and before a second segment is received.

7. The method of claim 6, further comprising:
generating an RRC reconfiguration message;
determining whether the generated RRC reconfiguration message exceeds a configured largest size of a packet data convergence protocol (PDCP) protocol data unit (PDU);
segmenting the generated RRC reconfiguration message into a plurality of segments, based on a result of the determining; and
transmitting at least one of the plurality of segments to the UE.

8. The method of claim 7, wherein transmitting the at least one of the plurality of segments to the UE comprises:
transmitting, to the UE via the SRB 1, a first segment from among the plurality of segments generated by segmenting the RRC reconfiguration message;
generating an RRC message to be transmitted via the SRB 1; and
transmitting the generated RRC message first before a second segment from among the plurality of segments generated by segmenting the RRC reconfiguration message is transmitted, based on a priority of the generated RRC message.

9. The method of claim 7, wherein transmitting the at least one of the plurality of segments to the UE comprises transmitting the plurality of segments via the SRB 2, and transmitting the RRC message via the SRB 1.

10. A user equipment (UE) for reporting UE capability information, the UE comprising:
a transceiver; and
a processor coupled to the transceiver and configured to receive a UE capability information request message from a base station, generate a UE capability information message based on the received UE capability information request message, determine whether the generated UE capability information message exceeds a configured largest size of a packet data convergence protocol (PDCP) protocol data unit (PDU), segment the generated UE capability information message into a plurality of segments based on a result of the determination, and transmit at least one of the plurality of segments to the base station,
wherein transmitting the at least one of the plurality of segments to the base station comprises transmitting the plurality of segments via a signaling radio bearer (SRB) 2, and transmitting a radio resource control (RRC) message via an SRB 1, and
wherein transmitting the at least one of the plurality of segments to the base station further comprises:
transmitting, to the base station via the SRB 1, a first segment from among the plurality of segments generated by segmenting the UE capability information message:
generating an RRC message to be transmitted via the SRB 1; and
transmitting the generated RRC message first before a second segment from among the plurality of segments generated by segmenting the UE capability information message is transmitted, based on a priority of the generated RRC message.

11. A base station for obtaining user equipment (UE) capability information, the base station comprising:
a transceiver; and
a processor coupled to the transceiver and configured to transmit a UE capability information request message to a UE, receive, from the UE, a plurality of segments generated by segmenting a UE capability information message, store the plurality of segments in a buffer, and reassemble the plurality of segments,
wherein receiving, from the UE, the plurality of segments generated by segmenting the UE capability information message comprises receiving the plurality of segments via a signaling radio bearer (SRB) 2 and receiving a radio resource control (RRC) message via an SRB 1, and
wherein receiving, from the UE, the plurality of segments generated by segmenting the UE capability information message further comprises:
receiving, from the UE via the SRB 1, a first segment from among the plurality of segments generated by segmenting the UE capability information message; and
receiving the RRC message via the SRB 1, after the first segment is received and before a second segment is received.

* * * * *